United States Patent
Yuan et al.

(10) Patent No.: US 11,442,218 B2
(45) Date of Patent: Sep. 13, 2022

(54) COLOR LIQUID CRYSTAL DISPLAYS AND DISPLAY BACKLIGHTS

(71) Applicant: Intematix Corporation, Fremont, CA (US)

(72) Inventors: Xianglong Yuan, Manteca, CA (US); Yi-Qun Li, Danville, CA (US)

(73) Assignee: Intematix Corporation, Fremont, CA (US)

( * ) Notice: Subject to any disclaimer, the term of this patent is extended or adjusted under 35 U.S.C. 154(b) by 0 days.

(21) Appl. No.: 16/791,702

(22) Filed: Feb. 14, 2020

(65) Prior Publication Data

US 2020/0264361 A1    Aug. 20, 2020

Related U.S. Application Data

(60) Provisional application No. 62/806,709, filed on Feb. 15, 2019.

(51) Int. Cl.
*F21V 8/00* (2006.01)
*G02F 1/13357* (2006.01)
(Continued)

(52) U.S. Cl.
CPC ............ *G02B 6/005* (2013.01); *C09K 11/616* (2013.01); *C09K 11/675* (2013.01); *C09K 11/7731* (2013.01); *C09K 11/886* (2013.01); *G02F 1/133606* (2013.01); *G02F 1/133611* (2013.01); *G02F 1/133614* (2021.01)

(58) Field of Classification Search
CPC ........ F21S 41/24; F21S 41/143; F21S 41/365; F21S 41/151; F21S 45/47; F21S 41/663; F21S 41/20; G02B 6/0036; G02B 6/0055; G02B 6/0075; G02B 6/005; F21W 2102/135; F21Y 2115/10; G02F 1/133606; G02F 1/133611; G02F 1/133614; G02F 1/133521; G02F 1/133509; G02F 1/133603; C09K 11/886; C09K 11/616; C09K 11/675; C09K 11/7731

See application file for complete search history.

(56) References Cited

U.S. PATENT DOCUMENTS

2008/0054281 A1*    3/2008    Narendran ............ H01L 33/507
                                                            257/98
2008/0315228 A1*   12/2008    Krames .................. H01L 33/46
                                                            257/98

(Continued)

FOREIGN PATENT DOCUMENTS

JP          2014207436 A   * 10/2014
WO    WO-2017214464 A1   * 12/2017  ............ G03B 21/204
WO    WO-2018203976 A1   * 11/2018  ....... G02F 1/133608

*Primary Examiner* — Rajarshi Chakraborty
*Assistant Examiner* — Glenn D Zimmerman
(74) *Attorney, Agent, or Firm* — CrossPond Law

(57) ABSTRACT

There is provided a display backlight (604), including an excitation source (644) for generating blue light (650); and a wavelength converter (654) being a unitary construction including a combination of a wavelength selective filter layer (658) bonded to a photoluminescence layer (660), where the photoluminescence layer (658) includes a green photoluminescence material and a red photoluminescence material; and where the wavelength selective filter layer (658) is transmissive to blue light and reflective to green and red light.

19 Claims, 15 Drawing Sheets

(51) Int. Cl.
    *C09K 11/88*   (2006.01)
    *C09K 11/61*   (2006.01)
    *C09K 11/67*   (2006.01)
    *C09K 11/77*   (2006.01)
    *G02F 1/1335*  (2006.01)

(56) References Cited

U.S. PATENT DOCUMENTS

| | | | |
|---|---|---|---|
| 2011/0002140 A1* | 1/2011 | Tsukahara | B32B 27/286 |
| | | | 362/602 |
| 2013/0258211 A1* | 10/2013 | Yoo | C09K 11/0883 |
| | | | 348/790 |
| 2015/0198762 A1* | 7/2015 | Kim | G02F 1/133606 |
| | | | 362/606 |
| 2016/0070137 A1* | 3/2016 | You | G02F 1/133609 |
| | | | 349/71 |
| 2017/0054110 A1* | 2/2017 | Racz | H01L 27/322 |
| 2017/0145309 A1* | 5/2017 | Zhu | H01L 25/0753 |
| 2017/0145310 A1* | 5/2017 | Li | H01L 33/502 |
| 2017/0256687 A1* | 9/2017 | Yoo | H01L 25/0753 |
| 2018/0080625 A1* | 3/2018 | Yamada | G02F 1/133605 |
| 2018/0188445 A1* | 7/2018 | Chen | G02B 6/0073 |
| 2019/0163018 A1* | 5/2019 | Lee | G02F 1/133606 |
| 2019/0186711 A1* | 6/2019 | Lenef | F21V 7/30 |
| 2019/0265551 A1* | 8/2019 | Liu | G09G 3/3406 |

\* cited by examiner

COLOR LIQUID CRYSTAL DISPLAYS AND DISPLAY BACKLIGHTS

CROSS-REFERENCE TO RELATED APPLICATIONS

This application claims the benefit of priority to U.S. Provisional Application No. 62/806,709, filed on Feb. 15, 2019, entitled "Color Liquid Crystal Displays and Display Backlights", which is hereby incorporated by reference in its entirety

BACKGROUND OF THE INVENTION

Field of the Invention

The invention relates to color liquid crystal displays (LCDs) and in particular a backlight arrangements for operating color LCDs that comprise photoluminescence materials.

Description of the Related Art

Color LCDs find application in a variety of electronics devices including televisions, computer monitors, laptops, tablet computers and smart phones. As is known, most color LCDs comprise a LC (liquid crystal) display panel and a white light emitting backlight for operating the display panel. Typically the LCD/backlight comprises multiple layers that are stacked on one another which can be problematic because these components require separate manufacture and assembly thereby increasing complexity and cost of the device.

The present invention concerns improvements in and relating to color LCDs and backlights.

SUMMARY OF THE INVENTION

Embodiments of the invention concern color LCDs that include photoluminescence materials, for example in the form of photoluminescence wavelength converting layer (film), which when excited by excitation light, typically blue light, generates white light for operating the display. Typically, the photoluminescence wavelength converting layer comprises a part of the backlight. Various embodiments of the invention concern arrangements which increase display efficacy by reducing the number of layers within the display/backlight by forming a wavelength converter of unitary construction.

According to an aspect of the invention, there is provided a display backlight, comprising: an excitation source for generating blue light; and a wavelength converter being a unitary construction comprising a combination of a wavelength selective filter layer bonded to a photoluminescence layer, wherein the photoluminescence layer comprises a green photoluminescence material and a red photoluminescence material; and wherein the wavelength selective filter layer is transmissive to blue light and reflective to green and red light. It will be understood that "transmissive" means "at least partially transmissive" and "reflective" means "at least partially reflective". "Bonded" or "bonding" may be "directly bonded" or "direct bonding", meaning that the wavelength selective filter layer is directly bonded to the photoluminescence layer. For instance, the photoluminescence layer may be manufactured separately from the wavelength selective filter layer and then "directly bonded" thereto using, for example, a light transmissive polymeric material. This arrangement should be understood as the wavelength selective filter layer being "directly bonded" or "direct bonding" to the photoluminescence layer, even in the presence of the intervening layer of the light transmissive polymeric material for example. Mere stacking of layers without bonding or an air interface between said layers is not encompassed within the meaning of "directly bonded" or "direct bonding" in this patent specification. Additionally, "bonded" or "bonding" may be "directly deposited" or "depositing directly", meaning that the photoluminescence layer is deposited (fabricated) directly onto the wavelength selective filter layer. For instance, in this patent specification, "depositing directly" means depositing in direct contact with, in that is there is no air gap between the layers. There may be an intervening layer, for instance a light transmissive layer, which is bonded to the wavelength selective filter layer and the photoluminescence layer. Such an arrangement is still encompassed within the meaning of "directly deposited" or "depositing directly" for the purposes of this specification.

An advantage of the photoluminescence layer being bonded to the wavelength selective filter layer is that this can increase light emission from the backlight by eliminating an air interface between the photoluminescence layer and wavelength selective filter layer. Such an air interface could otherwise lead to a greater probability of internal reflection occurring at the interface between the photoluminescence layer and wavelength selective filter layer.

An important feature of the invention is the unitary construction of the wavelength converter formed from the wavelength selective filter layer and the photoluminescence layer, such that the unitary construction is a combination of the wavelength selective filter layer and the photoluminescence layer. The provision of a unitary construction in this manner is more cost effective than known arrangements because it does not require the presence of an additional layer, such as light transmissive layer, to which the photoluminescence layer would normally be bound in known constructions. The absence of such an additional layer also makes the unitary construction formed in accordance with the invention more robust and reliable than known arrangements. Since the unitary construction has a simple and efficient design, its assembly and manufacture as part of the display backlight is significantly faster and less prone to errors than the assembly and manufacture of known backlights. Further, owing to the unitary construction of the wavelength converter comprising the combination of a wavelength selective filter layer bonded to the photoluminescence layer—the quantum efficiency of the display backlight can be superior to known arrangements and can provide a significant reduction (20-60%) in the amount of photoluminescence materials required.

In some embodiments, the photoluminescence layer may be bonded to the wavelength selective filter layer by directly depositing (fabricating) the photoluminescence layer directly onto the wavelength selective filter layer, by for example, the process of screen printing.

The photoluminescence layer may comprise a multi-layered structure comprising a layer of the green photoluminescence material and a layer of the red photoluminescence material. The provision of different layers of the photoluminescence materials enables different thickness of said layers which may make it simpler and more efficient to achieve desired relative intensities of red and green light generation.

When the photoluminescence layer comprises a respective layer for the green and red photoluminescence materials, this may provide a beneficial arrangement especially where the green and red photoluminescence materials have different absorption efficiencies.

In some embodiments, the layer of the red photoluminescence material is in closer proximity to the wavelength selective filter layer than the layer of the green photoluminescence material. It may be understood that "closer proximity" is used to specify that the layer of the red photoluminescence material is proximal (i.e. a proximal layer) to the wavelength selective filter layer, while the layer of the green photoluminescence material is distal (i.e. a distal layer) to the wavelength selective filter layer. Such an arrangement may be particularly beneficial when the red photoluminescence material comprises a manganese-activated fluoride phosphor (such as KSF) whose absorption efficiency is significantly lower than that of a green photoluminescence material. In this way, the provision of the red photoluminescence material, such as KSF, in a respective layer proximal (adjacent) to the wavelength selective filter layer can, compared with a single-layered structure, improve luminous efficacy of the backlight and reduce the quantity of red photoluminescence material required to achieve a comparable red emission characteristic.

A multi-layered photoluminescence layer may be fabricated by fabricating layer of the red photoluminescence, for example by extrusion, and then depositing layer of green photoluminescence material onto the layer of red photoluminescence material. The multi-layered photoluminescence layer can then be bonded to the wavelength selective filter using for example a light transmissive material.

Alternatively, the multi-layered photoluminescence layer can be bonded to the wavelength selective filter layer by directly depositing (fabricating), by for example screen printing, a layer of one photoluminescence material, for example the red photoluminescence material, onto the wavelength selective filter and then directly depositing (fabricating) a layer of second photoluminescence material on the layer of the first photoluminescence material.

The multi-layered photoluminescence layer may be fabricated by bonding together, using a light transmissive medium for example, separately fabricated layers of green and red photoluminescence materials. This may improve the ability of the backlight to achieve relative intensities of red and green light. The multi-layered photoluminescence layer can then be bonded to the wavelength selective filter using for example a light transmissive material.

Alternatively, or additionally, the photoluminescence layer may comprise a mixture of the green photoluminescence material and the red photoluminescence material in a single layer/light transmissive material. The provision of a mixture of the photoluminescence materials within a single layer/light transmissive material enhances ease of fabrication and may make it simpler and more efficient to achieve a relative intensity of the red and green color emissions.

It may be that the photoluminescence layer further comprises particles of a light scattering material. Inclusion of particles of a light scattering material within the one or more layers of the photoluminescence layer can reduce photoluminescence material usage by increasing scattering of light within the layer and increasing the probability of excitation light exciting the photoluminescence material. Alternatively and or in addition the wavelength converter can further comprise a light diffusing layer comprising particles of a light scattering material. It is found that the inclusion of a light diffusing layer can reduce the amount of photoluminescence material by up to 60%. Preferably, the light diffusing layer is bonded to the photoluminescence layer. The particles of light scattering material can be selected from the group comprising: zinc oxide (ZnO); silicon dioxide ($SiO_2$); titanium dioxide ($TiO_2$); magnesium oxide (MgO); barium sulfate ($BaSO_4$); aluminum oxide ($Al_2O_3$) and combinations thereof.

It may be that at least one of the green and red photoluminescence materials comprises a phosphor material.

The green photoluminescence material may comprise phosphor material with a general composition $(M)(A)_2S_4$:Eu, wherein: M is at least one of Mg, Ca, Sr and Ba; and A is at least one of Ga, Al, In, Y.

The red photoluminescence material may comprise phosphor material with a general composition represented by the chemical formula $MSe_{1-x}S_x$:Eu, wherein M is at least one of Mg, Ca, Sr, Ba and Zn and $0<x<1.0$.

The red photoluminescence material may comprise a manganese-activated fluoride phosphor material with general composition selected from the group comprising: $K_2SiF_6$:$Mn^{4+}$, $K_2GeF_6$:$Mn^{4+}$, $K_2TiF_6$:$Mn^{4+}$, $K_2SnF_6$:$Mn^{4+}$, $Na_2TiF_6$:$Mn^{4+}$, $Na_2ZrF_6$:$Mn^{4+}$, $Cs_2SiF_6$:$Mn^{4+}$, $Cs_2TiF_6$:$Mn^{4+}$, $Rb_2SiF_6$:$Mn^{4+}$, $Rb_2TiF_6K_3ZrF_7$:$Mn^{4+}$, $K_3NbF_7$:$Mn^{4+}$, $K_3TaF_7$:$Mn^{4+}$, $K_3GdF_6$:$Mn^{4+}$, $K_3LaF_6$:$Mn^{4+}$ and $K_3YF_6$:$Mn^{4+}$.

At least one of the green and red photoluminescence materials may comprise a quantum dot material. Use of quantum dot material can improve color gamut and color accuracy, and can reduce power consumption of the display backlight.

The green photoluminescence material may have a peak emission wavelength in a range from 530 nm to 545 nm.

The red photoluminescence material may have a peak emission wavelength in a range from 600 nm to 650 nm.

The blue light may have a dominant wavelength in a wavelength range 445 nm to 465 nm.

The backlight may further comprise a light guide having a light emitting face and edge faces, wherein the excitation source is configured to couple blue light into at least one edge face of the light guide and wherein the wavelength converter is disposed adjacent to the light emitting face of the waveguide. In such an arrangement, the light guide may be disposed between the excitation source and the wavelength converter. In this way, the light guide may help distribute the blue light generated by the excitation source more uniformly over the wavelength converter.

The backlight may further comprise a light guide having a light emitting face and edge faces, wherein the wavelength converter is disposed between the excitation source and at least one edge face of the light guide. In this way, the light guide may help distribute the light generated by the wavelength converter more uniformly.

The light guide may be planar. Such a form may be more compact and easily incorporated into the display backlight. In this way, the light guide may be planar or tapered to ensure uniform emission of light from the backlight.

The backlight may further comprise a brightness enhancement film.

The wavelength converter may further comprise a light transmissive protective layer.

In another aspect of the invention, there is envisaged a wavelength converter for a display backlight, the wavelength converter being a unitary construction comprising a combination of a wavelength selective filter layer bonded to a photoluminescence layer, wherein the photoluminescence layer comprises a green photoluminescence material and a red photoluminescence material; and wherein the wavelength selective filter layer is transmissive to blue light and substantially reflective to green and red light. The bonding may be direct bonding, meaning that it is directly bonded.

The photoluminescence layer may comprise a layer of the green photoluminescence material and a layer of the red photoluminescence material. The provision of different layer of the photoluminescence materials enables different thickness of said layers which may make it simpler and more efficient to achieve relative intensities of red, blue, green. It may be that the layer of the red photoluminescence material is in closer proximity to the wavelength selective filter layer than the layer of the green photoluminescence material.

Alternatively, or additionally, the photoluminescence layer may comprise a mixture of the green photoluminescence material and the red photoluminescence material. The provision of a mixture of the photoluminescence materials may make it simpler and more efficient to achieve a single color point.

It may be that at least one of the green and red photoluminescence materials comprises a phosphor material.

It may be that at least one of the green and red photoluminescence materials comprises a quantum dot material.

It may be that the green photoluminescence material has a peak emission wavelength in a range from 530 nm to 545 nm.

It may be that the red photoluminescence material has a peak emission wavelength in a range from 600 nm to 650 nm.

The wavelength converter may further comprise a light diffusing layer. It is found that the inclusion of a light diffusing layer can reduce the amount of photoluminescence material by up to 60%.

The light diffusing layer may comprise particles of light scattering material are selected from the group consisting of: zinc oxide (ZnO); silicon dioxide ($SiO_2$); titanium dioxide ($TiO_2$); magnesium oxide (MgO); barium sulfate ($BaSO_4$); aluminum oxide ($Al_2O_3$) and combinations thereof.

The wavelength converter may further comprise a protective layer.

In another aspect, the invention encompasses a method of manufacturing the wavelength converter described herein, comprising: providing a wavelength selective filter layer; and forming a unitary construction by depositing a photoluminescence layer onto a face of and bonding to the wavelength selective filter layer. The bonding may be direct bonding, meaning that it is directly bonded.

Such a method provides a simple and efficient way of making the unitary construction. The method may be a more cost effective, reliable and robust method of manufacturing the wavelength converter. This is particularly the case since known display backlights typically utilize an additional layer of light transmissive material for coupling with the photoluminescence layer/material, and the absence of such an additional layer simplifies the manufacturing process, as taught by the method of the present invention.

The photoluminescence layer may comprise a layer of the green photoluminescence material and a layer of the red photoluminescence material. The provision of different layer of the photoluminescence materials enables different thickness of said layers which may make it simpler and more efficient to achieve relative intensities of red, blue, green.

Alternatively, or additionally, the photoluminescence layer may comprise a mixture of the green photoluminescence material and the red photoluminescence material. The provision of a mixture of the photoluminescence materials may make it simpler and more efficient to achieve a single color point.

It may be that the photoluminescence layer is deposited by screen printing, which provides a fast deposition method and a durable layer of photoluminescence material.

In another aspect, the invention contemplates a display backlight, comprising: an excitation source for generating blue light with a peak emission wavelength in a wavelength range 445 nm to 465 nm; and a wavelength converter being a unitary construction comprising a combination of a wavelength selective filter layer bonded to a photoluminescence layer, wherein the photoluminescence layer comprises a green photoluminescence material with a peak emission in a wavelength range 530 nm to 545 nm and a red photoluminescence material with a peak emission in a wavelength range 600 nm to 650 nm; and wherein the wavelength selective filter layer is transmissive to blue light and substantially reflective to green and red light. The bonding may be direct bonding, meaning that it is directly bonded.

The photoluminescence layer may comprise a layer of the green photoluminescence material and a layer of the red photoluminescence material. The provision of different layer of the photoluminescence materials enables different thickness of said layers which may make it simpler and more efficient to achieve relative intensities of red, blue, green.

Alternatively, or additionally, the photoluminescence layer may comprise a mixture of the green photoluminescence material and the red photoluminescence material. The provision of a mixture of the photoluminescence materials may make it simpler and more efficient to achieve a single color point.

In another aspect, the invention provides a wavelength converter for a display backlight, the wavelength converter being a unitary construction comprising a combination of a wavelength selective filter layer bonded to a photoluminescence layer, wherein the photoluminescence layer comprises a green photoluminescence material with a peak emission in a wavelength range 530 nm to 545 nm and a red photoluminescence material with a peak emission in a wavelength range 600 nm to 650 nm; and wherein the wavelength selective filter layer is transmissive to blue light and substantially reflective to green and red light. The bonding may be direct bonding, meaning that it is directly bonded.

The photoluminescence layer may comprise a layer of the green photoluminescence material and a layer of the red photoluminescence material. The provision of different layer of the photoluminescence materials enables different thickness of said layers which may make it simpler and more efficient to achieve relative intensities of red, blue, green.

Alternatively, or additionally, the photoluminescence layer may comprise a mixture of the green photoluminescence material and the red photoluminescence material. The provision of a mixture of the photoluminescence materials may make it simpler and more efficient to achieve a single color point.

BRIEF DESCRIPTION OF THE DRAWINGS

In order that the present invention is better understood, embodiments of the invention will now be described, by way of example only, with reference to the accompanying drawings in which.

DETAILED DESCRIPTION OF THE INVENTION

Figure 1:
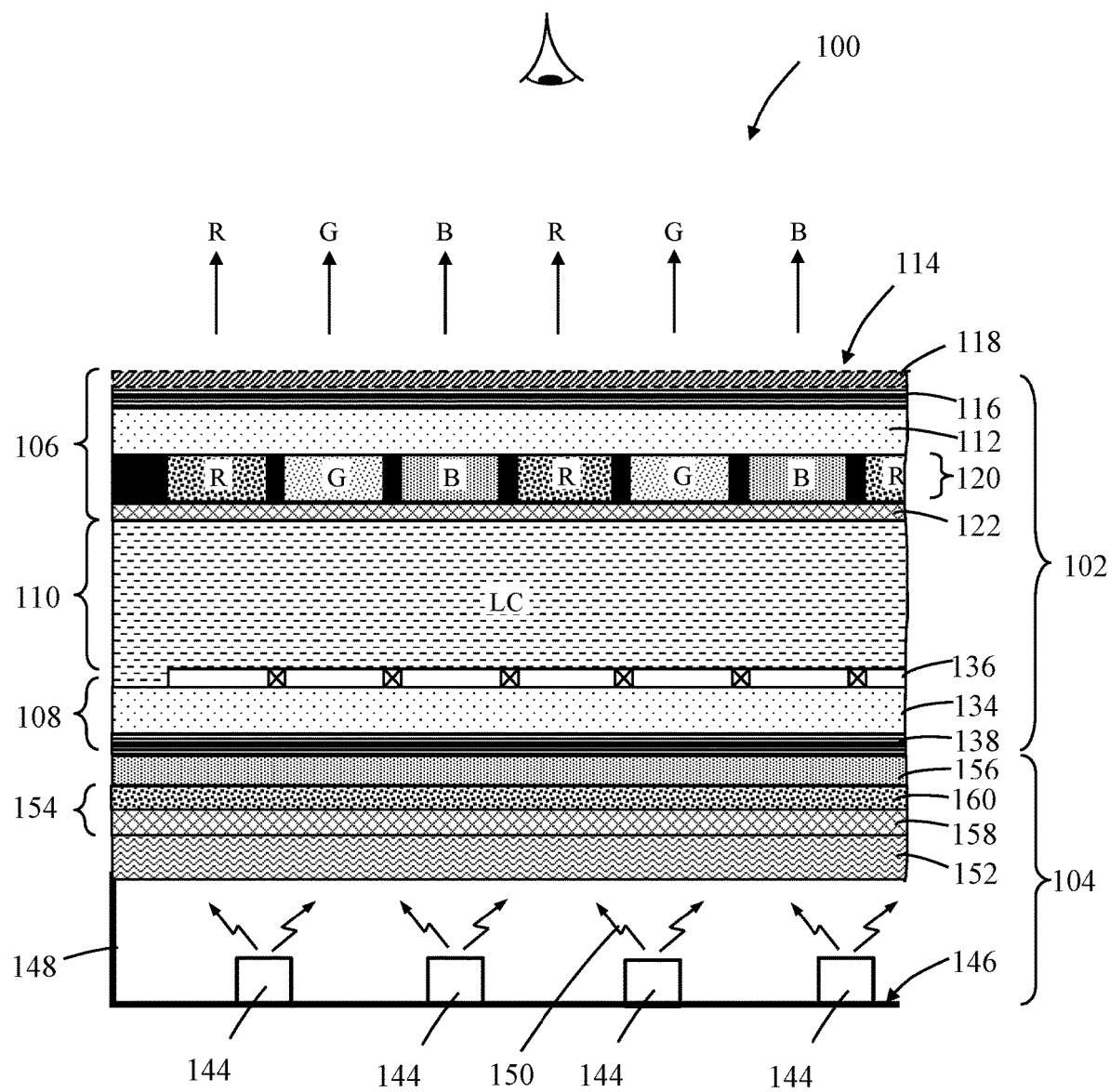
FIG. 1 is a schematic cross-sectional representation of a direct-lit color liquid crystal display (LCD) in accordance with an embodiment of the invention.

Embodiments of the invention are directed to color LCDs including a photoluminescence wavelength converting layer which when excited by excitation light, typically blue light, generates white light for operating the display. Typically, the photoluminescence wavelength converting layer comprises a part of the backlight. Various embodiments of the invention concern arrangements which increase display efficacy by reducing the number of layers within the display/backlight or otherwise reduces light losses at the interface between layers of the display by for example eliminating the air interfaces.

Embodiments of the present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration. Throughout this specification like reference numerals preceded by the figure number are used to denote like features.

Referring to FIG. 1 there is shown a schematic cross-sectional representation of a direct-lit light transmissive Color LCD (Liquid Crystal Display) 100 formed in accordance with an embodiment of the invention. The Color LCD 100 comprises a LC (Liquid Crystal) Display Panel 102 and a Display Backlight 104. The Backlight 104 is operable to generate white light for operating the LC Display Panel 102.

LC Display Panel

As shown in FIG. 1, the LC display panel 102 comprises a transparent (light transmissive) Front (light/image emitting) Plate 106, a transparent Back Plate 108 and a Liquid Crystal (LC) 110 filling the volume between the Front and Back Plates 106, 108.

Figure 2:
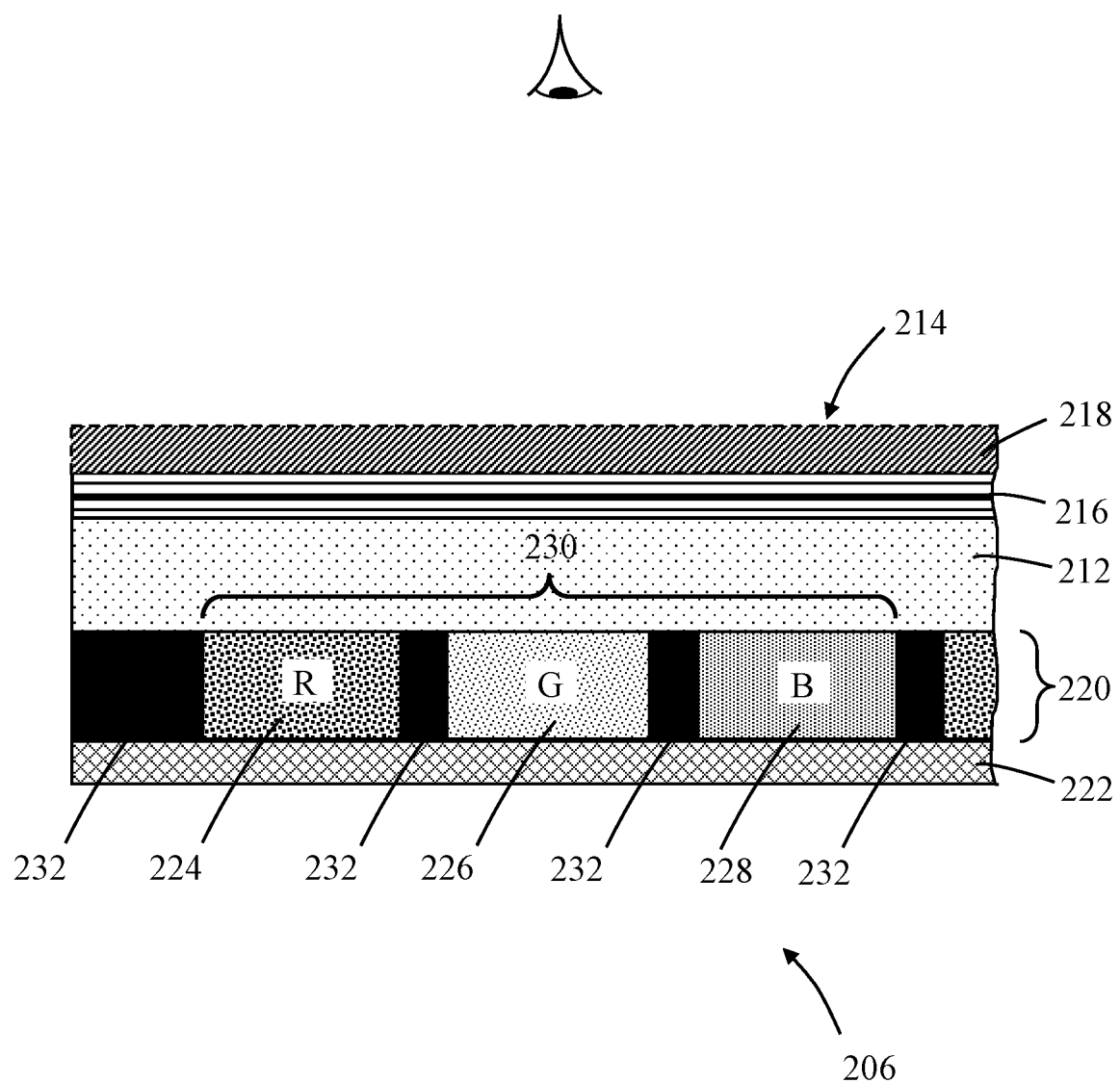
FIG. 2 is a schematic cross-sectional representation of a front plate of the color LCD of FIG. 1.

As shown in FIG. 2, the Front Plate 206 can comprise a glass plate 212 having on its upper surface, that is the face of the plate comprising the viewing face 214 of the display, a first polarizing filter layer 216. Optionally, the outermost viewing surface of the front plate can further comprise an anti-reflective layer 218. On its underside, that is the face of the front plate 206 facing the liquid crystal (LC), the glass plate 212 can further comprise a color filter plate 220 and a light transmissive common electrode plane 222 (for example transparent Indium Tin Oxide, ITO).

Figure 3:
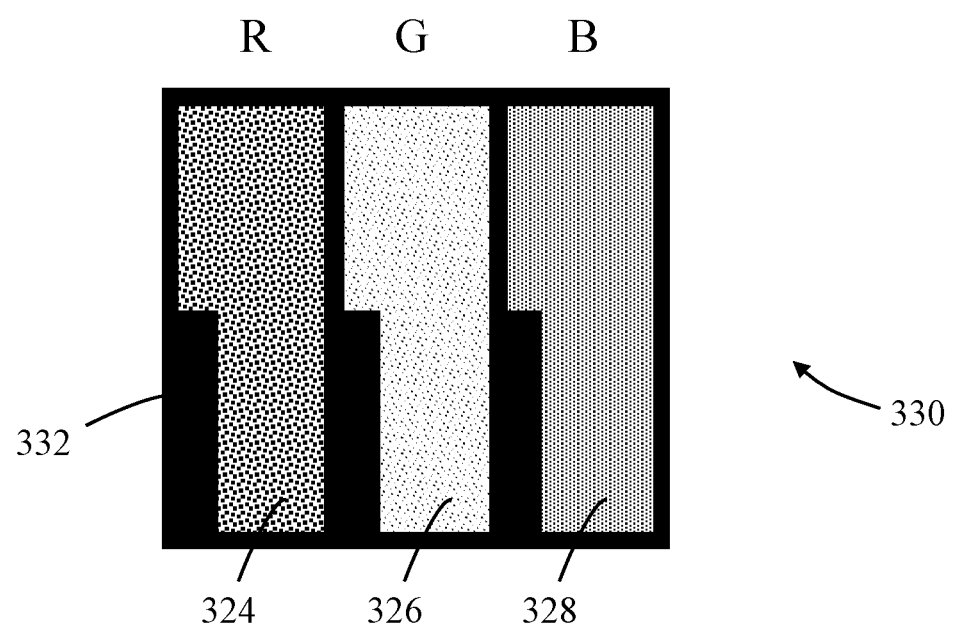
FIG. 3 is a schematic diagram of a unit pixel of a color filter plate of the color LCD of FIG. 1.
Figure 4:
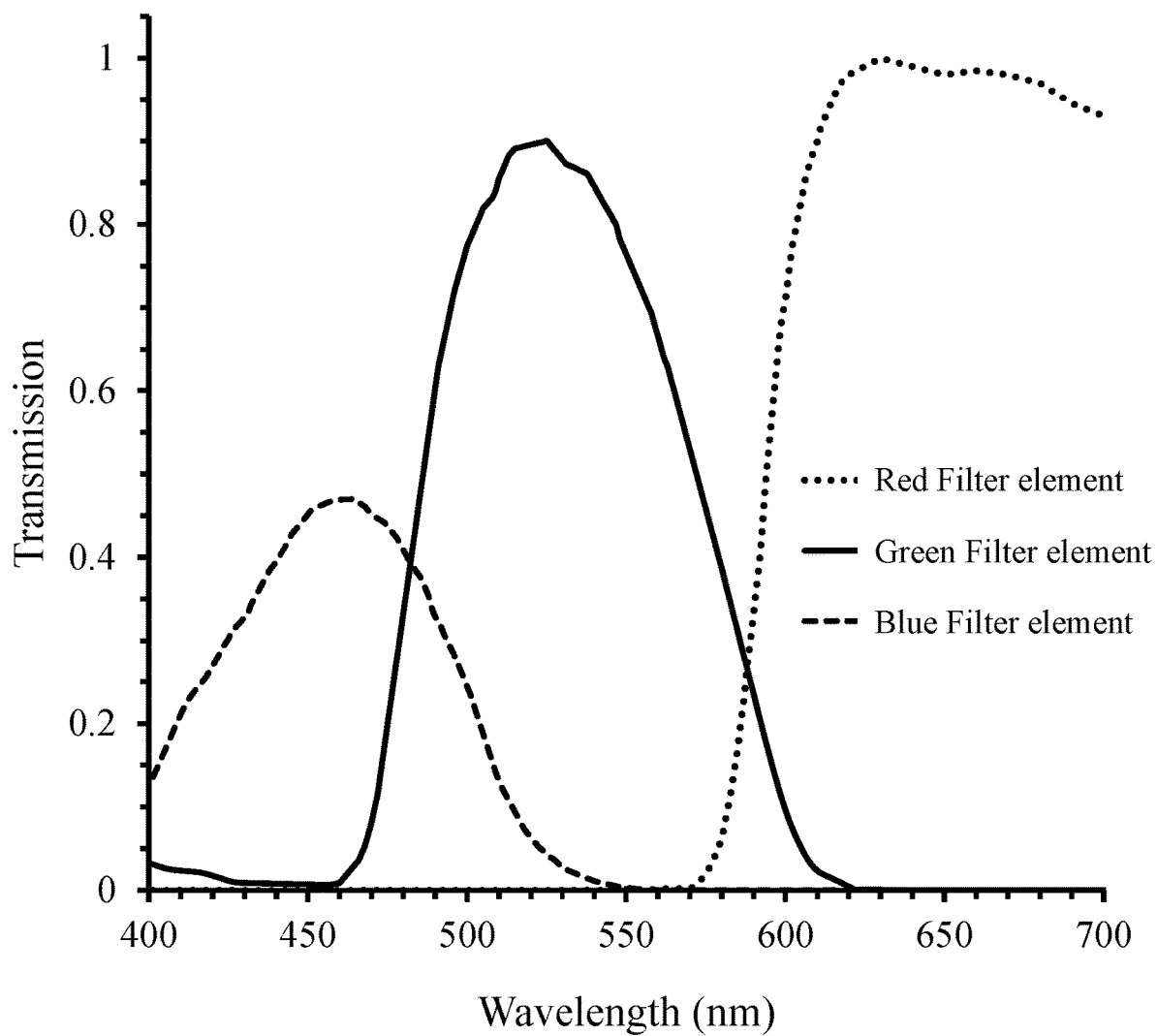
FIG. 4 shows the filtering characteristics, light transmission versus wavelength, for red, green and blue filter elements of a color filter plate of a color LCD display according to an embodiment of the invention.

The color filter plate 220 comprises an array of different color sub-pixels filter elements 224, 226, 228 which respectively allow transmission of red (R), green (G), and blue (B) light. Each unit pixel 230 of the display comprises a group of three sub-pixels filter elements 224, 226, 228. FIG. 3 is a schematic diagram of a unit pixel 330 of the color filter plate. Each RGB sub-pixel 324, 326, 328 comprises a respective color filter pigment, typically an organic dye, which allows passage of light corresponding to the color of the sub-pixel only. The RGB sub-pixel elements 324, 326, 328 can be deposited on the glass plate 212 (see FIG. 2) with opaque dividers/walls (black matrix) 332 between each of the sub-pixels 324, 326, 328. The black matrix 332 can be formed as a grid mask of metal, such as for example chromium, defining the sub-pixels 324, 326, 328 and providing an opaque gap between the sub-pixels and unit pixels 330. To minimize reflection from the black matrix, a double layer of Cr and CrOx may be used, but of course, the layers may comprise materials other than Cr and CrOx. The black matrix film which can be sputter-deposited underlying or overlying the sub-pixel elements may be patterned using methods that include photolithography. FIG. 4 shows the filtering characteristics, light transmission versus wavelength, for red (R), green (G) and blue (B) filter elements of a Hisense filter plate optimized for TV applications.

Figure 5:
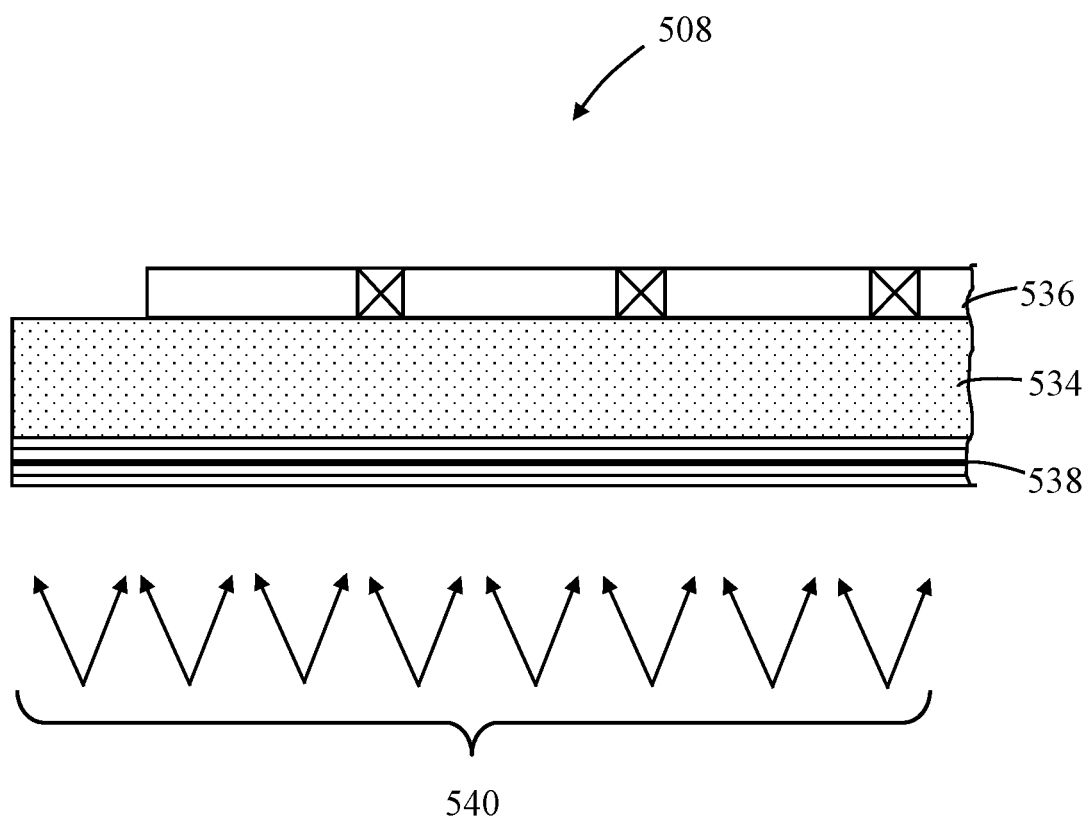
FIG. 5 is a schematic cross-sectional representation of a back plate of the color LCD of FIG. 1.

Referring to FIG. 5, the back plate 508 can comprise a glass plate 534 having on its upper surface (that is the surface facing the LC) a TFT (Thin Film Transistor) layer 536. The TFT layer 536 comprises an array of TFTs, in which there is a transistor corresponding to each individual color sub-pixel of each unit pixel. Each TFT is operable to selectively control passage of the light to its corresponding sub-pixel. On a lower surface (that is the surface facing the backlight) of the glass plate 534 there is provided a second polarizing filter layer 538. The directions of polarization of the polarizing filter 116 and 138 (FIG. 1) are aligned perpendicular to one another.

Direct-Lit Backlight

Figure 6:
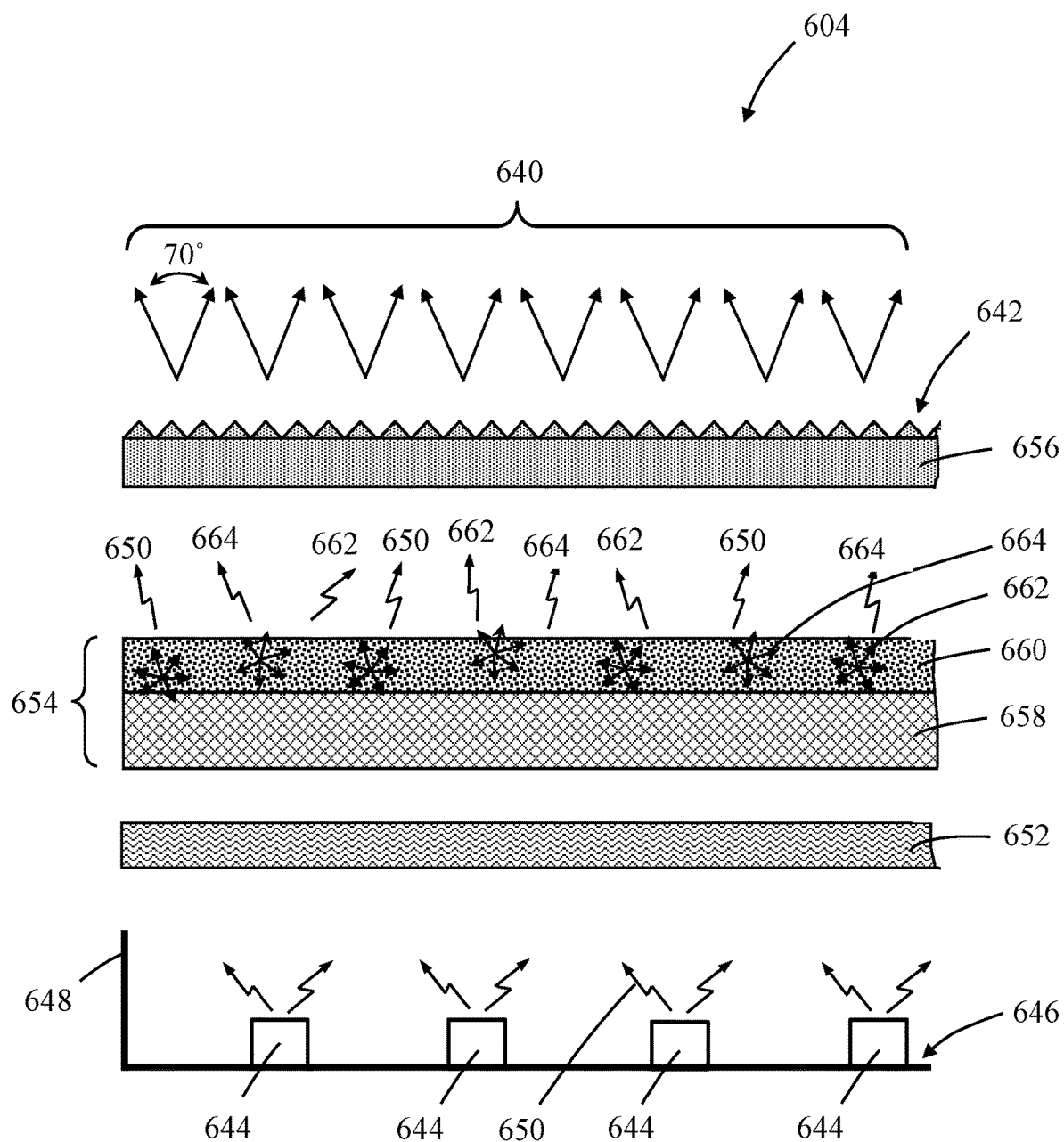
FIG. 6 is a schematic exploded cross-sectional representation of a direct-lit backlight of the color LCD of FIG. 1.

Referring to FIG. 6, there is shown an exploded view of direct-lit Backlight 604 in accordance with an embodiment of the invention. As described above, the Backlight is operable to generate and emit white light 640 towards the rear of the LC Display Panel for operating the color LCD.

As shown in FIG. 6, the backlight 604 can comprise a direct-lit arrangement comprising an array of excitation sources 644 that are provided on the floor 646 of a light reflective enclosure 648 and distributed over the entire surface of the display. Each excitation source 644 is operable to generate blue excitation light 650 of dominant wavelength ranging from 445 nm to 465 nm, typically from 450 nm to 460 nm. The excitation sources can comprise blue light emitting GaN LEDs.

The Backlight 604 further comprises, in order of proximity from the excitation sources 644, a light diffusive layer 652, a wavelength converter 654 and a Brightness Enhancement Film (BEF) 656. The light diffusive layer 652 ensures uniform illumination of the wavelength converter 654 with blue excitation light 650.

Brightness Enhancement Film (BEF)

The Brightness Enhancement Film (BEF) 656, also known as a Prism Sheet, comprises a precision microstructured optical film and controls the emission of white light 640 from the backlight within a fixed angle (typically 70 degrees), thereby increasing luminous efficacy of the backlight. Typically, the BEF comprises an array of micro-prisms on a light emitting face of the film and can increase brightness by 40-60%. The BEF 656 can comprise a single BEF or a combination of multiple BEFs and in the case of the latter even greater increases in brightness can be achieved. Examples of suitable BEFs include Vikuiti™ BEF II from 3M or prism sheets from MNTech. In some embodiments, the BEF 656 can comprise a Multi-Functional Prism Sheet (MFPS) that integrates a prism sheet with a diffusion film and can have a better luminous efficiency than a normal prism sheet. In some embodiments, the BEF 656 can comprise a Micro-Lens Film Prism Sheet (MLFPS) such as those available from MNTech.

Wavelength Converter

Referring to FIG. 6, the wavelength converter 654 is of a unitary construction and comprises a wavelength selective filter layer 658 and a photoluminescence wavelength conversion layer 660. For the sake of brevity, in the following description the wavelength selective filter layer will be referred to as the "filter layer" and the photoluminescence wavelength conversion layer will be referred to as the "photoluminescence layer". In this specification, a unitary construction refers to a wavelength converter in which the photoluminescence layer is fabricated, or deposited, on the surface of the filter layer to form a single component. This is to be contrasted to separately fabricating the photoluminescence layer and filter layer.

One of the important features of the invention is the unitary construction of the wavelength converter formed from the filter layer 658 and the photoluminescence layer 660, such that the unitary construction is a combination of the filter layer 658 and the photoluminescence layer 660. The provision of a unitary construction in this manner is more cost effective than known arrangements because it does not require the presence of an additional layer, such as light transmissive layer, to which the photoluminescence layer would normally be bound in known constructions. The absence of such an additional layer also makes the unitary construction formed in accordance with the invention more robust and reliable than known arrangements. Since the unitary construction has a simple and efficient design, its assembly and manufacture as part of the display backlight is significantly faster and less prone to errors than the assembly and manufacture of known backlights. Further, experiments have confirmed that a unitary construction can improve the quantum efficiency of the display backlight by approximately 10% compared with known arrangements, and provides a significant reduction (20-60%) in the amount of photoluminescence materials required. It may be that the red photoluminescence material is in direct contact with the wavelength selective filter layer.

Wavelength Converter—Photoluminescence Layer

The photoluminescence layer 658 contains photoluminescence materials and in operation converts blue excitation light 650 into white light 640 for operating the LC Display Panel. More specifically, the photoluminescence layer 658 contains blue light excitable green-emitting (Peak emission wavelength 530 nm to 545 nm) and red-emitting (Peak emission wavelength 600 nm to 650 nm) photoluminescence materials. The combination of photoluminescence generated red light 662, photoluminescence generated green light 664 and unconverted blue excitation light 650 results in a white light emission product 640. To optimize the efficacy and color gamut of the display, the green- and red-emitting photoluminescence materials are selected to match their peak emission (PE) wavelength $\lambda_p$ with the transmission characteristic of their corresponding color filter elements. Preferably, the green-emitting photoluminescence material has a peak emission wavelength $\lambda_p \approx 535$ nm. In order to maximize display color gamut and efficacy, the green-emitting and/or red-emitting photoluminescence materials preferably comprise narrow-band emitting materials having an emission peak with a FWHM (Full Width Half Maximum) of about 50 nm of less.

The green- and red-emitting photoluminescence materials can comprise phosphor materials or quantum dots (QDs) or combinations thereof. For the purposes of illustration, the current description specifically refers to photoluminescence materials embodied as phosphor materials. The phosphor materials can comprise inorganic and organic phosphor materials. Inorganic phosphors can comprise aluminate, silicate, phosphate, borate, sulfate, chloride, fluoride or nitride phosphor materials. As is known phosphor materials are doped with a rare-earth element called an activator. The activator typically comprises divalent europium, cerium or tetravalent manganese. Dopants such as halogens can be substitutionally or interstitially incorporated into the crystal lattice and can for example reside on lattice sites of the host material and/or interstitially within the host material. Examples of suitable green-emitting and red-emitting phosphor materials are given in tables 1 and 2 respectively.

TABLE 1

Example green-emitting phosphor materials

| Phosphor family | | Composition | $\lambda_p$ (nm) | FWHM (nm) |
|---|---|---|---|---|
| Sulfide | | $SrGa_2S_4$:Eu | ≈536 | 48-50 |
| β-SiAlON | | $M_xSi_{12-(m+n)}Al_{m+n}O_nN_{16-n}$:Eu  M = Mg, Ca and/or Sr | 525-545 | 50-52 |
| Aluminate | YAG | $Y_3(Al_{1-x}Ga_x)_5O_{12}$:Ce | 500-550 | ≈110 |
| Aluminate | LuAG | $Lu_3(Al_{1-x}M_x)_5O_{12}$:Ce | 500-550 | ≈110 |
| Silicate | | $A_2SiO_4$:Eu  A = Mg, Ca, Sr and/or Ba | 500-550 | ≈70 |
| Silicate | | $(Sr_{1-x}Ba_x)_2SiO_4$:Eu | 500-550 | ≈70 |

TABLE 2

Example red-emitting phosphor materials

| Phosphor family | | Composition | $\lambda_p$ (nm) | FWHM (nm) |
|---|---|---|---|---|
| Hexafluorosilicate | KSF | $K_2SiF_6:Mn^{4+}$ | ≈632 | ≈10 |
| Hexafluorosilicate | KTF | $K_2TiF_6:Mn^{4+}$ | ≈632 | ≈10 |
| Selenide sulfide | CSS | $MSe_{1-x}S_x:Eu$ M = Mg, Ca, Sr and/or Ba | 600-630 | 50-55 |
| Selenide sulfide | CSS | CaSeS:Eu | 610-630 | 50-55 |
| Silicon-nitride 1:1:1:3 | CASN | $CaAlSiN_3:Eu$ $(Ca_{1-x}Sr_x)AlSiN_3:Eu$ | 600-620 | ≈75 |
| Silicon-nitride 2:5:8 | | $Ba_{2-x}Sr_xSi_5N_8:Eu$ | 580-620 | ≈80 |

A quantum dot (QD) is a portion of matter (e.g. semiconductor) whose excitons are confined in all three spatial dimensions that may be excited by radiation energy to emit light of a particular wavelength or range of wavelengths. QDs can comprise different materials, for example cadmium selenide (CdSe). The color of light generated by a QD is enabled by the quantum confinement effect associated with the nano-crystal structure of the QD. The energy level of each QD relates directly to the physical size of the QD. For example, the larger QDs, such as red QDs, can absorb and emit photons having a relatively lower energy (i.e. a relatively longer wavelength). On the other hand, green QDs, which are smaller in size can absorb and emit photons of a relatively higher energy (shorter wavelength). Examples of suitable QDs can include: CdZnSeS (cadmium zinc selenium sulfide), $Cd_xZn_{1-x}$ Se (cadmium zinc selenide), $CdSe_xS_{1-x}$ (cadmium selenium sulfide), CdTe (cadmium telluride), $CdTe_xS_{1-x}$, (cadmium tellurium sulfide), InP (indium phosphide), $In_xGa_{1-x}$ P (indium gallium phosphide), InAs (indium arsenide), $CuInS_2$ (copper indium sulfide), $CuInSe_2$ (copper indium selenide), $CuInS_xSe_{2-x}$ (copper indium sulfur selenide), Cu $In_xGa_{1-x}$ $S_2$ (copper indium gallium sulfide), $CuIn_xGa_{1-x}Se_2$ (copper indium gallium selenide), $CuIn_xAl_{1-x}$ $Se_2$ (copper indium aluminum selenide), $CuGaS_2$ (copper gallium sulfide) and $CuInS_{2x}ZnS_{1-x}$ (copper indium selenium zinc selenide). The optical properties of the core nano-crystals in one material can be altered by growing an epitaxial-type shell of another material. Depending on the requirements, the core/shell nano-crystals can have a single shell or multiple shells. The shell materials can be chosen based on the band gap engineering. For example, the shell materials can have a band gap larger than the core materials so that the shell of the nano-crystals can separate the surface of the optically active core from its surrounding medium. In the case of the cadmium-based QDs, e.g. CdSe QDs, the core/shell quantum dots can be synthesized using the formula of CdSe/ZnS, CdSe/CdS, CdSe/ZnSe, CdSe/CdS/ZnS, or CdSe/ZnSe/ZnS. Similarly, for $CuInS_2$ quantum dots, the core/shell nanocrystals can be synthesized using the formula of $CuInS_2$/ZnS, $CuInS_2$/CdS, $CuInS_2$/$CuGaS_2$, $CuInS_2$/$CuGaS_2$/ZnS and so on.

As described above the wavelength converter is of a unitary construction. When using inorganic phosphor materials, the green-emitting and red-emitting phosphors, which are in the form of particles, can be incorporated as a mixture in a curable light transmissive liquid binder material and the mixture deposited directly as a uniform layer on a wavelength selective filter layer using for example screen printing or slot die coating. In this patent specification, depositing directly means in direct contact with, in that is there is no air gap between the layers. There may be an intervening layer, for instance a light transmissive binder/bonding layer, which is bonded to the wavelength selective filter layer and the photoluminescence layer. Such an arrangement is still encompassed within the meaning of "deposing directly" and "in direct contact with" for the purposes of this specification. By way of illustration only, the various layers in the figures are shown separated when they are not in direct contact with each other, that is where they are fabricated separately and then stacked together. When depositing the photoluminescence wavelength converting layer using screen printing, the light transmissive binder material can comprise for example a light transmissive UV-curable acrylic adhesive such as UVA4103 clear base from STAR Technology of Waterloo, Ind. USA. An advantage of depositing the photoluminescence layer directly onto the filter layer is that this can increase light emission from the backlight by eliminating an air interface between the photoluminescence layer and filter layer. Such an air interface could otherwise lead to a greater probability of internal reflection occurring at the interface between the photoluminescence layer and filter layer. The photoluminescence layer can be of a thickness in a range 50 μm to 100 μm, more typically 40 μm to 80 μm.

In any embodiment, the photoluminescence layer can further incorporate particles of a light scattering (diffusive) material, preferably zinc oxide (ZnO). The light diffusive material can comprise silicon dioxide ($SiO_2$), titanium dioxide ($TiO_2$), magnesium oxide (MgO), barium sulfate ($BaSO_4$), aluminum oxide ($Al_2O_3$) or combinations thereof. Inclusion of a light scattering material can increase uniformity of light emission from the photoluminescence layer and can eliminate the need for a separate light diffusive layer as are commonly used in color LCDs. Additionally, incorporating particles of a light scattering material with the mixture of green- and red-emitting phosphor can result in an increase in light generation by the photoluminescence layer and a substantial, up to 40%, reduction in the quantity of phosphor materials required to generate a given color of light. Given the relatively high cost of phosphor materials, inclusion of an inexpensive light scattering material can result in a significant reduction in manufacturing cost for larger displays such a tablet computers, laptops, TVs and monitors. Further details of an exemplary approach to implement scattering particles are described in U.S. Pat. No. 8,610,340 issued Dec. 17, 2013, which is hereby incorporated by reference in its entirety. The size of the light scattering particles can be selected to scatter excitation light relatively more than light generated by the phosphor. In some embodiments, the light scattering material particles have an average diameter (D50) of 200 nm of less, typically 100 nm to 150 nm.

Wavelength Converter—Wavelength Selective Filter Layer

Figure 7A:
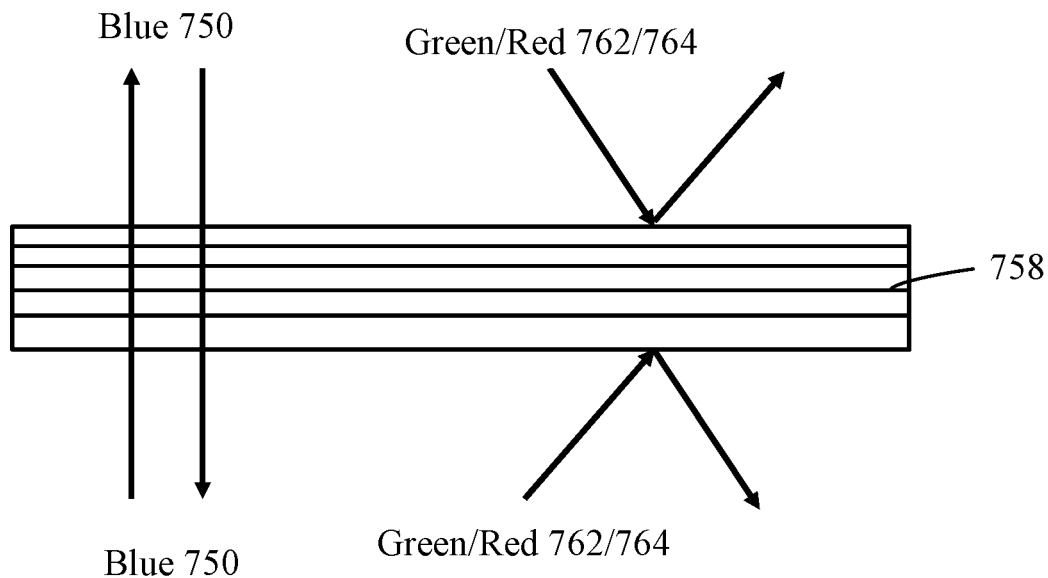
FIG. 7A is a schematic representation of a wavelength converter filter layer.
Figure 7B:
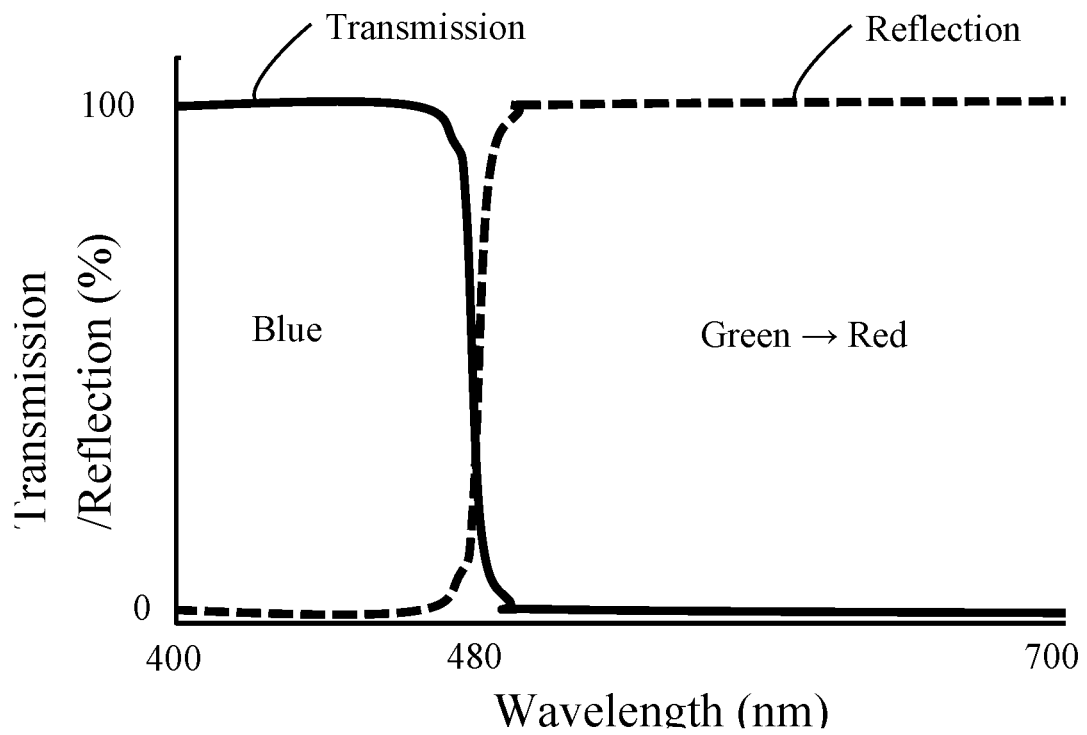
FIG. 7B is a schematic representation of the transmission and reflection characteristics of a wavelength converter filter layer.

Referring to FIG. 7A there is shown a schematic representation of a wavelength selective filter layer (filter layer) 758. FIG. 7B is a schematic representation of the transmission and reflection characteristics of a wavelength selective filter layer. As illustrated in the figures, the filter layer is substantially transmissive to blue light 750 and substantially reflective to green light 762 and to red light 764.

The filter layer 758 can comprise a thin-film dichroic filter (interference filter). Typically the filter layer comprises a film of thickness 80 μm to 150 μm.

As indicated in FIG. 6, the wavelength converter 654 is disposed between the light diffusive layer 652 and BEF 656 with the filter layer 658 facing the light diffusive layer 652: that is the wavelength converter 654 is located in the optical path between the excitation sources 644 and LCD Display panel 102 (FIG. 1) with the filter layer 658 facing the excitation sources 644. With such a configuration, the filter layer 658 allows the free passage of blue excitation light 650 to the photoluminescence layer 660 where a proportion of it will be converted, through a process of photoluminescence, to green photoluminescence light 662 and red photoluminescence light 664. Due to the isotropic nature of photoluminescence light generation, green light 662 and red light 664 generated by the green- and red-emitting phosphors will be emitted in all directions including directions towards the excitation sources 644. However, due to the optical characteristics of the filter layer 658 such green and red light 662, 664 will be reflected by the filter layer 658 back towards the Display panel (as shown in FIG. 1).

Edge-Lit Backlight

While the backlight of the invention finds particular utility in direct-lit backlight arrangements, the backlight, in particular wavelength converter of the invention, also finds utility in edge-lit backlight arrangements.

Figure 8:
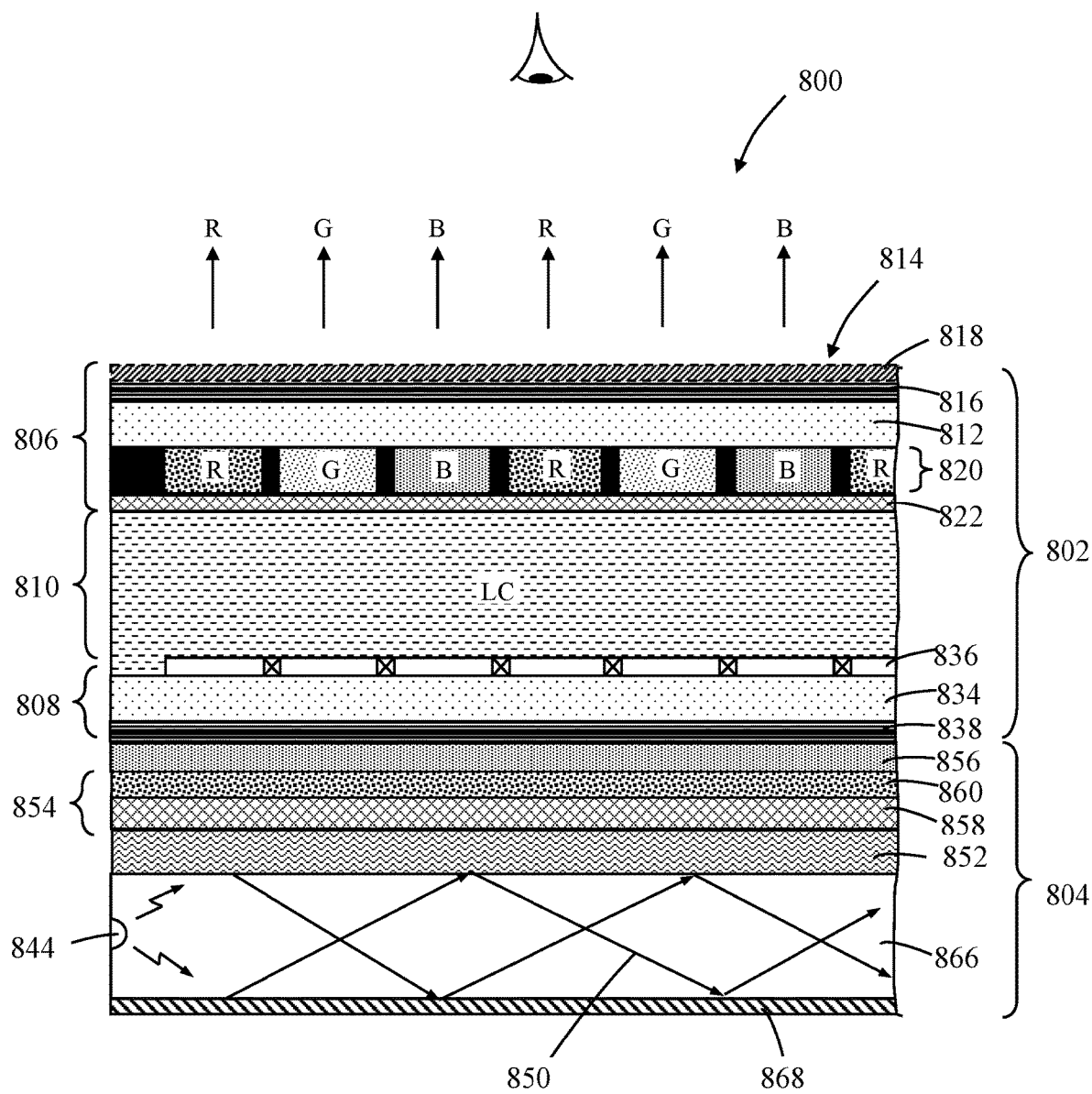
FIG. 8 is a schematic cross-sectional representation of an edge-lit color LCD in accordance with an embodiment of the invention.
Figure 9:
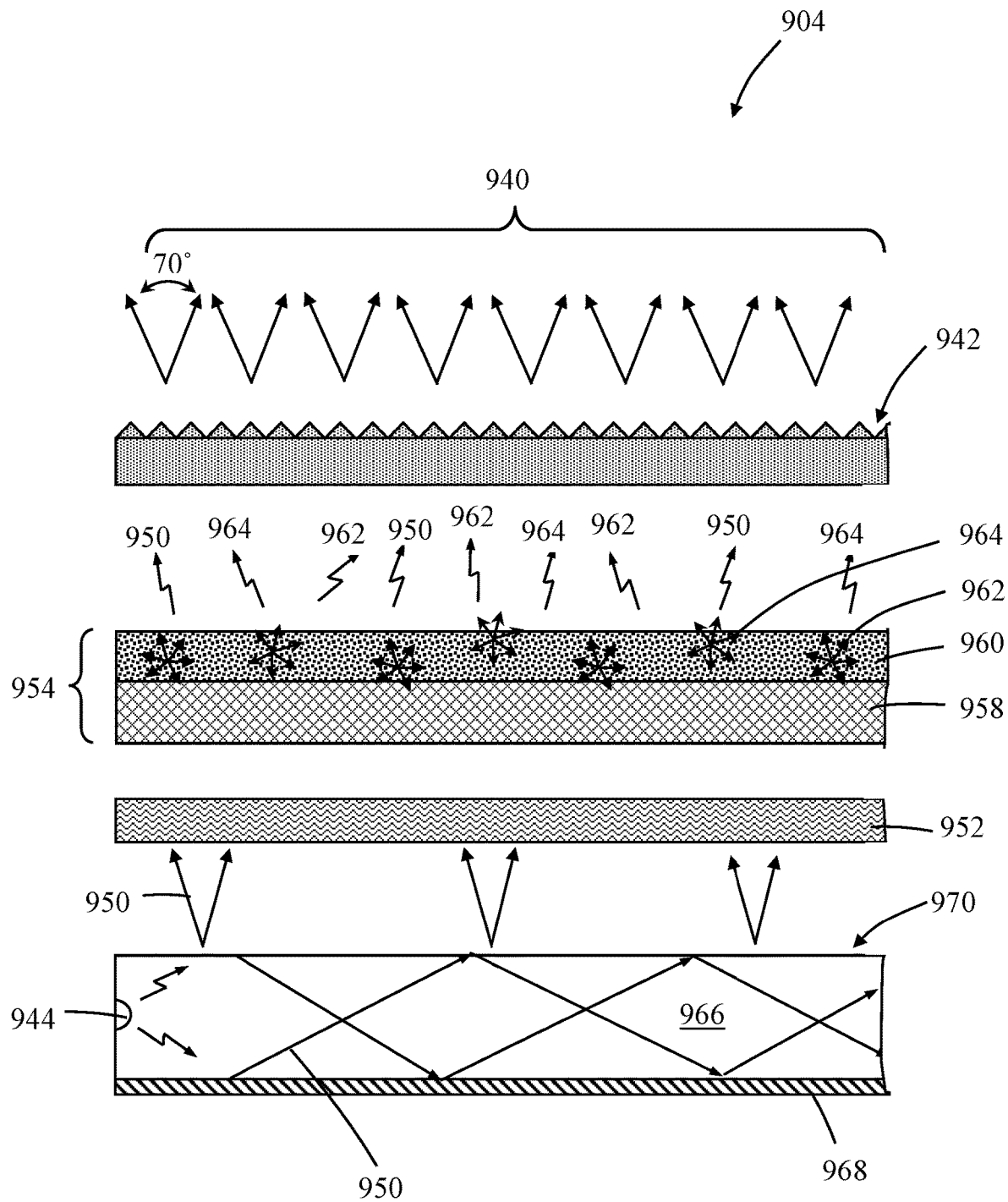
FIG. 9 is a schematic exploded cross-sectional representation of an edge-lit backlight of the color LCD of FIG. 8.

FIG. 8 is a schematic cross-sectional representation of an edge-lit color LCD 800 in accordance with an embodiment of the invention. FIG. 9 is a schematic exploded cross-sectional representation of an edge-lit backlight 904. The backlight 904 comprises a light guide (waveguide) 966 with one or more excitation sources 944 located along one or more edges of the light guide 966. As indicated, the light guide 966 can be planar, though, in some embodiments, it can be tapered (wedge-shaped) for promoting a more uniform emission of excitation light from a front light emitting face 970 (upper face as shown in FIG. 9 that faces the Display Panel) of the light guide 966.

The excitation sources 944 are configured such that in operation, they generate blue excitation light 950 which is coupled into one or more edges of the light guide 966 and then guided, by total internal reflection, throughout the volume of the light guide 966 and finally emitted from the front light emitting face 970 of the light guide (upper face that faces the Display Panel). As shown in FIG. 9, and to prevent the escape of light from the backlight 904, the rear face (lower face as shown) of the light guide 966 can comprise a light reflective layer (surface) 968 such as Vikuiti™ ESR (Enhanced Spectral Reflector) film from 3M.

As with the direct-lit configuration of FIG. 6, the wavelength converter 954 is disposed between the light diffusive layer 952 and BEF 956 with the filter layer 958 facing the light diffusive layer 952: that is the wavelength converter 954 is located in the optical path between the excitation sources 944 and an LCD Display panel (as shown in FIG. 8) with the filter layer 958 facing the excitation sources 944. With such a configuration, the filter layer 958 allows the free passage of blue excitation light 950 to the photoluminescence layer 960 where a proportion of it will be converted, through a process of photoluminescence, to green photoluminescence light 962 and red photoluminescence light 964. Due to the isotropic nature of photoluminescence light generation, green light 962 and red light 964 generated by the green- and red-emitting phosphors will be emitted in all directions including directions towards the light guide 966. However, due to the optical characteristics of the filter layer 958 such green and red light will be reflected by the filter layer 958 back towards the Display panel (as shown in FIG. 8).

Figure 10:
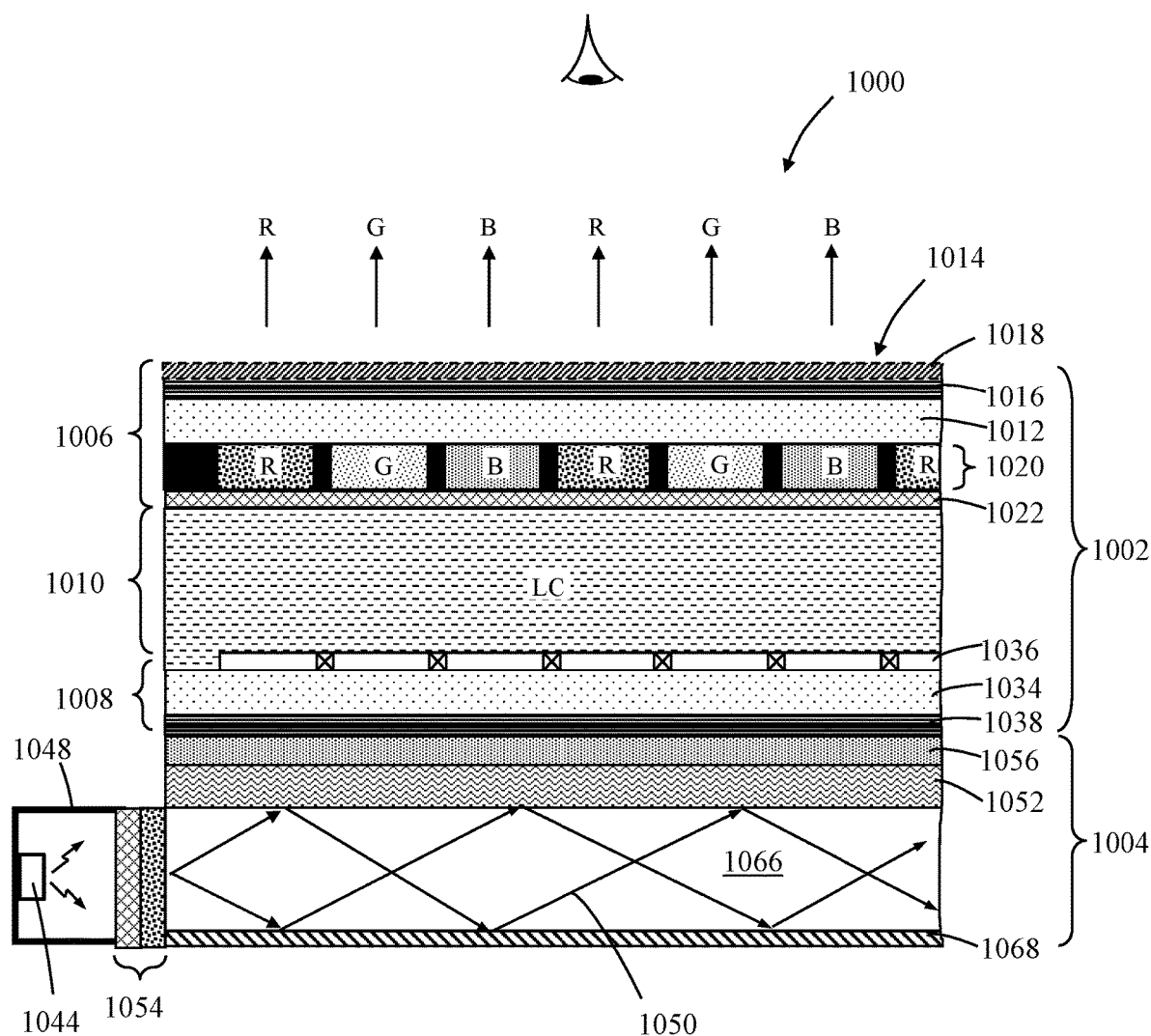
FIG. 10 is a schematic cross-sectional representation of an edge-lit color LCD in accordance with an embodiment of the invention.
Figure 11:
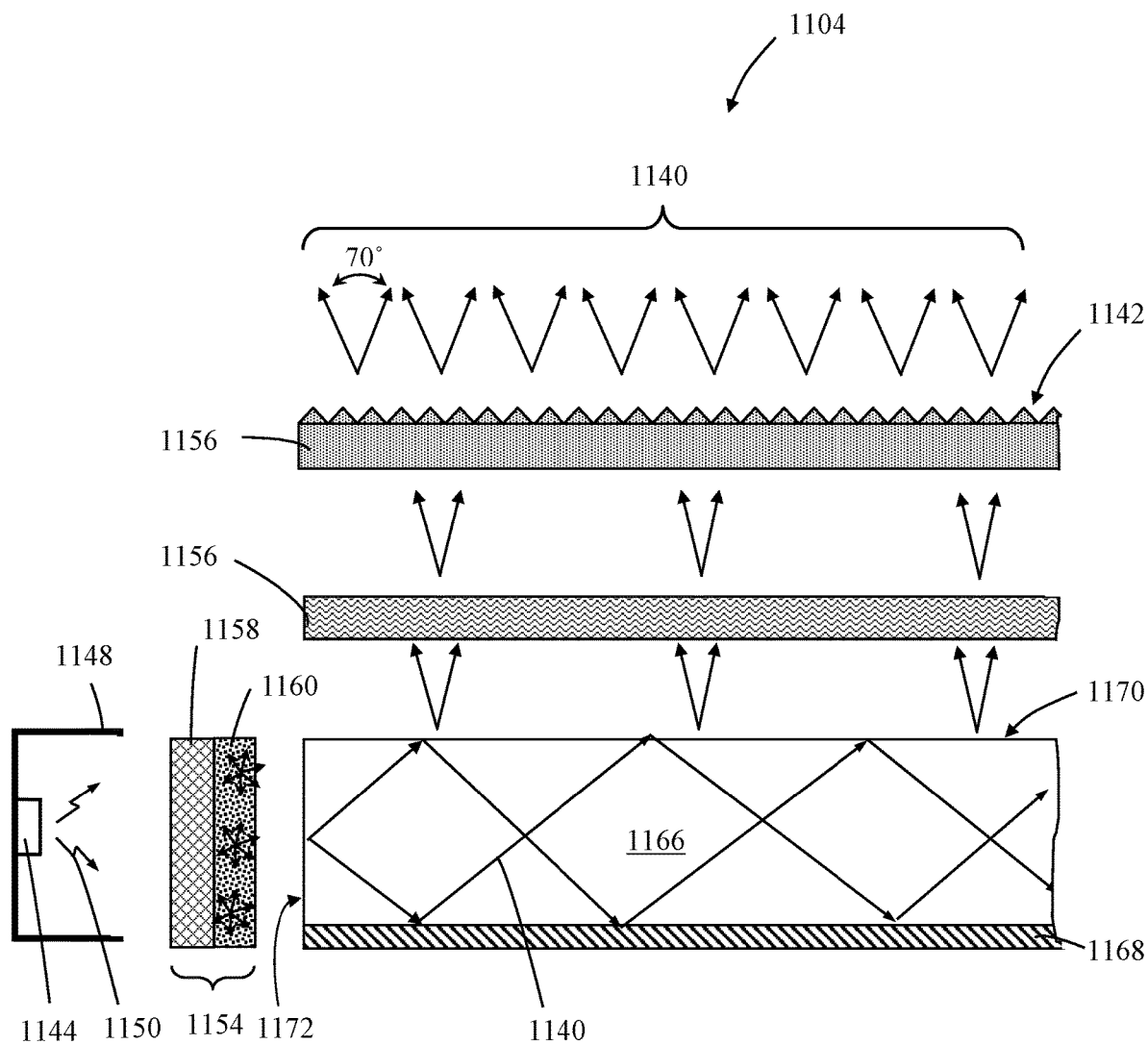
FIG. 11 is a schematic exploded cross-sectional representation of an edge-lit backlight of the color LCD of FIG. 10.

FIG. 10 is a schematic cross-sectional representation of a further edge-lit color LCD 1000 in accordance with an embodiment of the invention. FIG. 11 is a schematic exploded cross-sectional representation of an edge-lit backlight 1104. As with the backlight of FIG. 9, the backlight 1104 comprises a light guide (waveguide) 1166 with one or more excitation sources 1144 located along one or more edges of the light guide 1166. As indicated, the light guide 1166 can be planar, though, in some embodiments, it can be tapered (wedge-shaped) for promoting a more uniform emission of light from a front light emitting face 1170 of the light guide (upper face as shown in FIG. 11 that faces the Display Panel).

As shown in FIG. 11, and to prevent the escape of light from the backlight 1104, the rear face (lower face as shown) of the light guide 1166 can comprise a light reflective layer (surface) 1168 such as Vikuiti™ ESR (Enhanced Spectral Reflector) film from 3M.

In this embodiment, and as indicated in FIG. 11, the wavelength converter 1154 is disposed on an edge face 1172 of the light guide 1166 with the photoluminescence layer 1160 facing the edge face 1172 of the light guide 1166: that is the wavelength converter 1154 is located in the optical path between the excitation sources 1144 and light guide 1166 (and thereby the LCD Display panel shown in FIG. 10) with the filter layer 1158 facing the excitation sources 1144, and the photoluminescence layer 1160 facing the edge face 1172 of the light guide 1166. With such a configuration, the filter layer 1158 allows the free passage of blue excitation light 1150 to the photoluminescence layer 1160 where a proportion of it will be converted, through a process of photoluminescence, to green photoluminescence light and red photoluminescence light. Due to the isotropic nature of photoluminescence light generation, green light and red light generated by the green- and red-emitting phosphors will be emitted in all directions including directions towards the excitation sources 1144. However, due to the optical characteristics of the filter layer 1158, such green and red light will be reflected by the filter layer 1158 back towards the edge face 1172 of the light guide 1166. It will be appreciated that in this embodiment, white light 1140 is coupled into the light guide 1166.

FIGS. 12 to 19 are schematic cross-sectional representations wavelength converters 1254 to 1954 respectively, for use in the color LCDs of FIGS. 1, 8 and 10.

Figure 12:
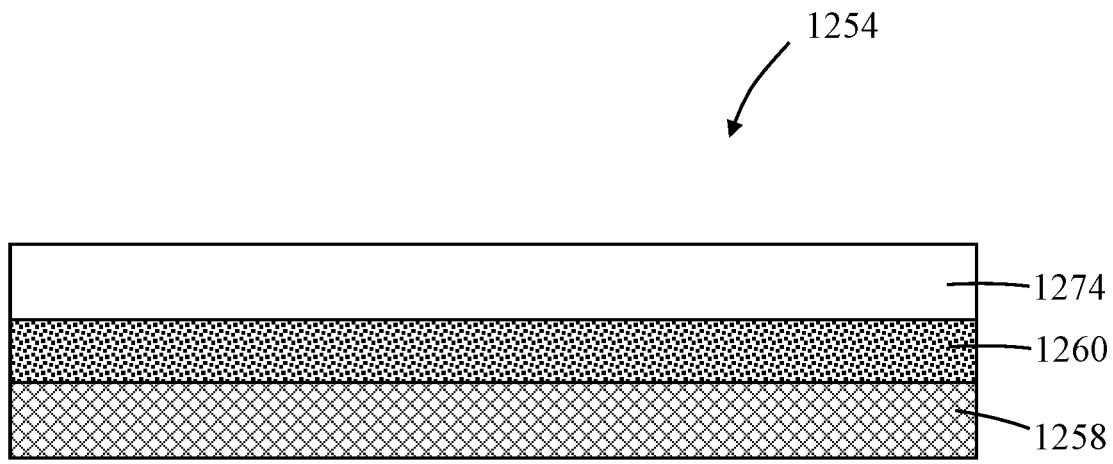
FIGS. 12 to 19 are schematic cross-sectional representations of wavelength converters for use in the color LCDs of FIGS. 1, 8 and 10.

As shown in FIG. 12, the wavelength converter 1254 can further comprise a light transmissive protective layer 1274 on the photoluminescence layer 1260. The light transmissive protective layer 1274 can comprise a coating of a light transmissive material, such as silicone, that is deposited directly onto the photoluminescence layer 1260. Such a protective layer 1274 can be of a thickness of about 10 μm and can be deposited by screen printing or slot-die coating. In other arrangements, the protective layer 1274 can comprise a light transmissive film of thickness 20 μm to 50 μm, such as PET (Polyethylene Terephthalate), which is laminated (bonded) to the photoluminescence layer. Such a light transmissive protective layer 1274 can provide protection to the photoluminescence layer 1274 which can be particularly beneficial when the red photoluminescence material comprises a manganese-activated fluoride phosphor such as KSF.

Figure 13:
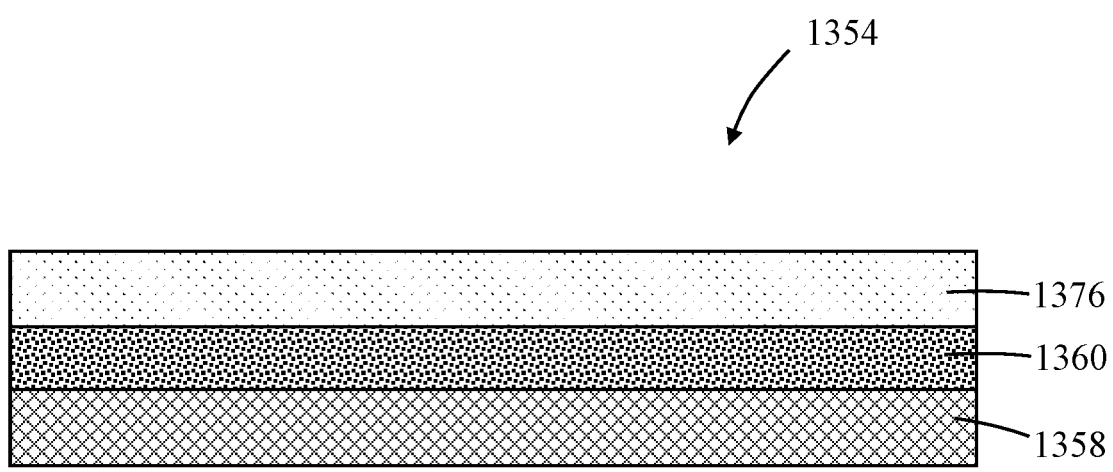

As shown in FIG. 13, the wavelength converter 1354 can further comprise a light diffusive (Diffuser) layer 1376 on the photoluminescence layer 1360. The light diffusive layer 1376 can comprise a coating of a light transmissive material, such as silicone loaded with light scattering (diffusive) particles, which is deposited directly onto the photoluminescence layer 1360. The light diffusive layer 1360 can increase the color uniformity and intensity uniformity of the white light generated by the backlight. Further, it has been found that the inclusion of a diffusing layer can reduce the phosphor amount required significantly (up to 60%) without affecting the quantum efficiency. Such a significant reduction in phosphor usage provides a substantial cost saving; especially for large format displays since the phosphor layer is provided over the entire display area.

Figure 14:
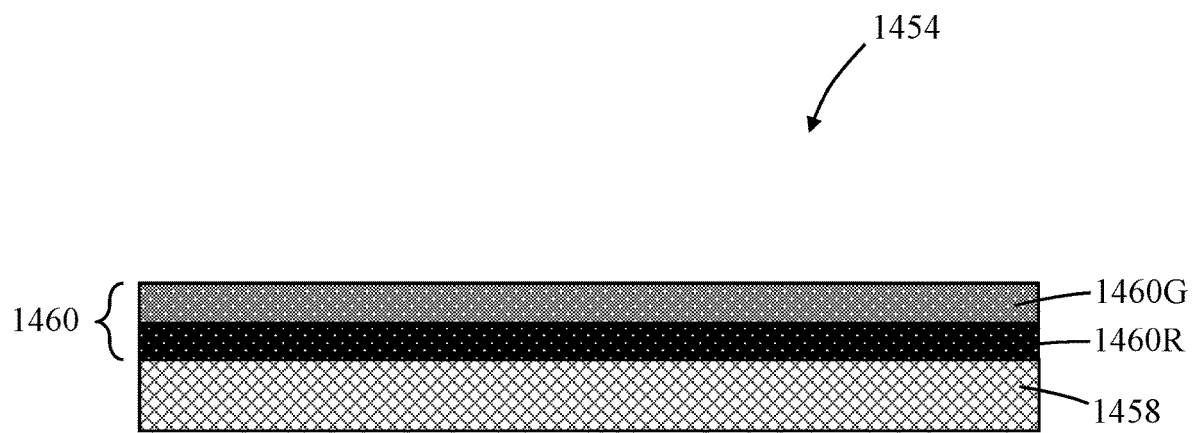

As shown in FIG. 14, the wavelength converter 1454 comprises a photoluminescence layer 1460 and a filter layer 1458. In this embodiment the photoluminescence layer 1460 comprises a multi-layered structure comprising a first layer 1460G containing the green photoluminescence material (green photoluminescence layer) and a layer 1460R containing the red photoluminescence material (red photoluminescence layer). As indicated, the red photoluminescence layer 1460R is directly in contact with and bonded to the filter layer 1458, that is the layer of the red photoluminescence material is in closer proximity to the wavelength selective filter layer than the layer of the green photoluminescence material. It will be understood that "closer proximity" is used to specify that the layer of the red photoluminescence material is proximal (i.e. a proximal layer) to the wavelength selective filter layer, while the layer of the green photoluminescence material is distal (i.e. a distal layer) to the wavelength selective filter layer. Such an arrangement may be particularly beneficial when the red photoluminescence material comprises a manganese-activated fluoride phosphor (such as KSF) whose absorption efficiency is significantly lower than that of a green photoluminescence material. In this way, the provision of the red photoluminescence material, such as KSF, in a respective layer proximal (adjacent) to the wavelength selective filter layer can, compared with a single-layered photoluminescence structure, improve luminous efficacy of the backlight and reduce the quantity of red photoluminescence material required to achieve a comparable red emission characteristic. The wavelength converter 1454 can be fabricated by directly depositing (fabricating), by for example screen printing, the red photoluminescence layer 1460R onto the wavelength selective filter layer 1458. Then, the green photoluminescence layer 1460G can be directly deposited (fabricated), by for example screen printing, on the red photoluminescence layer 1460R.

Figure 15:
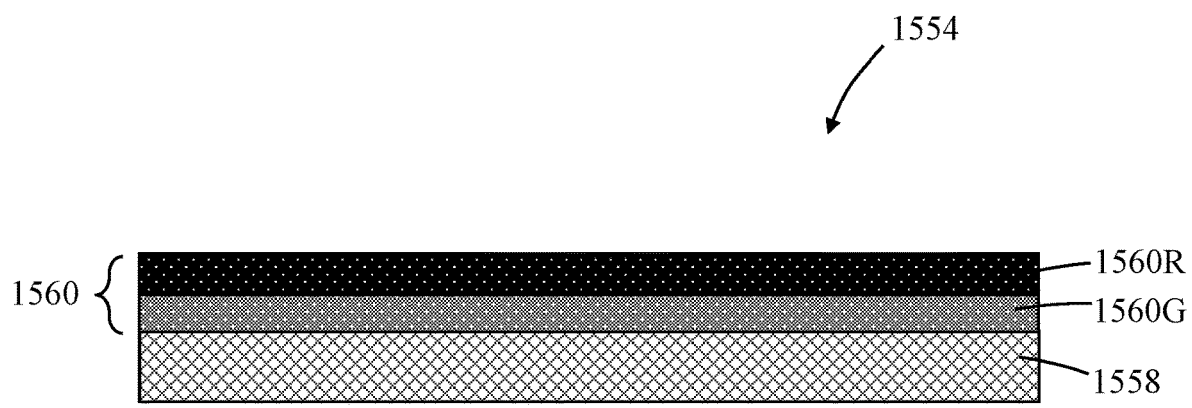

As shown in FIG. 15, the wavelength converter 1554 is the same as that shown in FIG. 14, except the green photoluminescence layer 1560G and the red photoluminescence layer 1560R are transposed such that the green photoluminescence layer 1560G is directly in contact with and bonded to the filter layer 1558.

Figure 16:
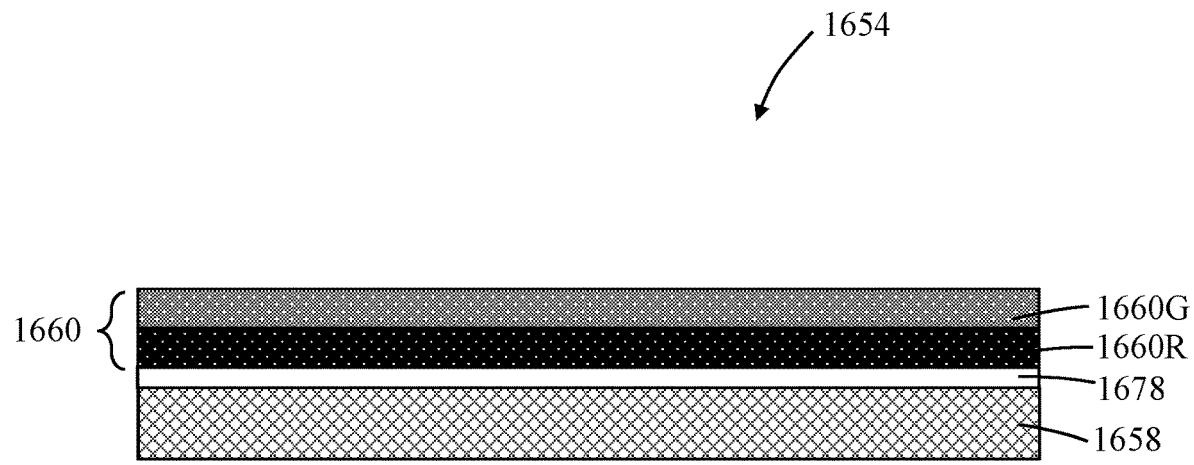

As shown in FIG. 16, the wavelength converter 1654 is the same as that shown in FIG. 14, except that the multi-layered photoluminescence layer 1660 is fabricated separately and then bonded to the wavelength selective filter layer 1658. The photoluminescence layer 1660 can be fabricated by fabricating a first layer, by for example extrusion, containing one of the red or green photoluminescence materials and the remaining layer deposited directly (fabricated) on the first photoluminescence layer by depositing by screen printing. This embodiment thus differs from FIG. 14 in that the photoluminescence layer 1660 is bonded to the filter layer 1658 with an intervening light transmissive bonding layer 1678 therebetween. It will be understood that the since there is no air gap between the photoluminescence layer 1660 and the filter layer 1658, the photoluminescence layer 1660 is disclosed as being directly deposited on or directly bonded to the filter layer 1658, despite the presence of the light transmissive bonding layer 1678. This is because it retains the technical effect of the invention despite the presence of one or more intervening layers.

Figure 17:
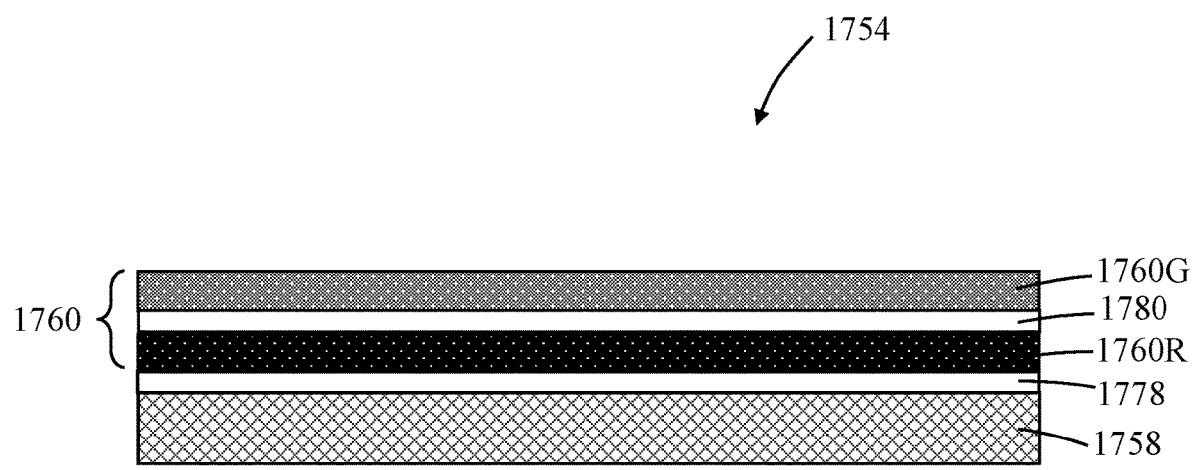

As shown in FIG. 17, the wavelength converter 1754 is the same as that shown in FIG. 16, except that there is an additional intervening light transmissive bonding layer 1680 located between the green photoluminescence layer 1760G and the red photoluminescence layer 1760R. In this embodiment, the green and red photoluminescence layers 1760G/1760R are manufactured separately (for example by an extrusion process) before being bonded to one another by means of light transmissive bonding layer 1680. The resulting photoluminescence layer 1760 is bonded to the filter layer 1758 to fabricate the wavelength converter 1754. In this embodiment, the red photoluminescence layer 1760R is bonded to the filter layer 1758, despite the presence of the light transmissive bonding layer 1778.

Figure 18:
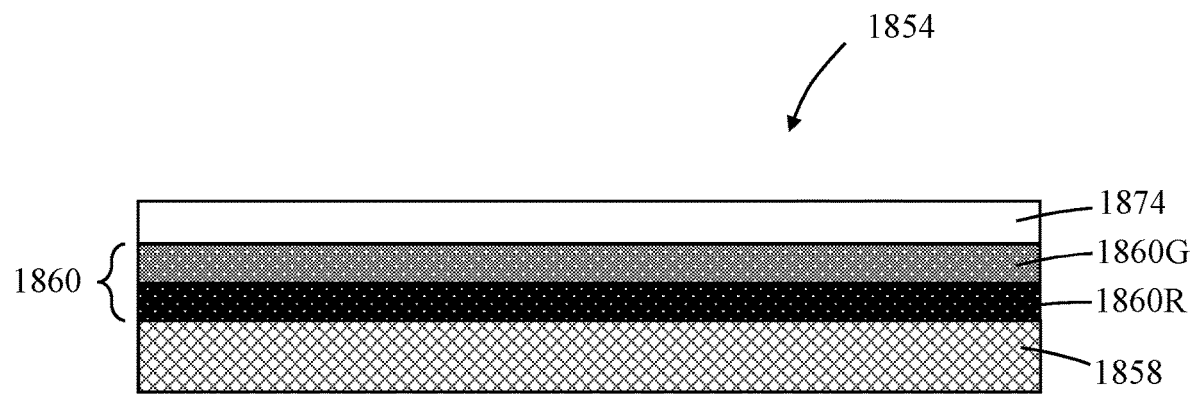

As shown in FIG. 18, the wavelength converter 1854 is the same as that shown in FIG. 14, except a light transmissive protective layer 1874 is deposited on top of the green photoluminescence layer 1860G on the side facing away from the filter layer 1858. Such a light transmissive protective layer 1874 can be of a thickness of about 10 μm and can be deposited by screen printing or slot-die coating. In other arrangements, the light transmissive protective layer 1874 can comprise a light transmissive film of thickness 20 μm to 50 μm, such as PET (Polyethylene Terephthalate), which is laminated to the photoluminescence layer 1860.

Figure 19:
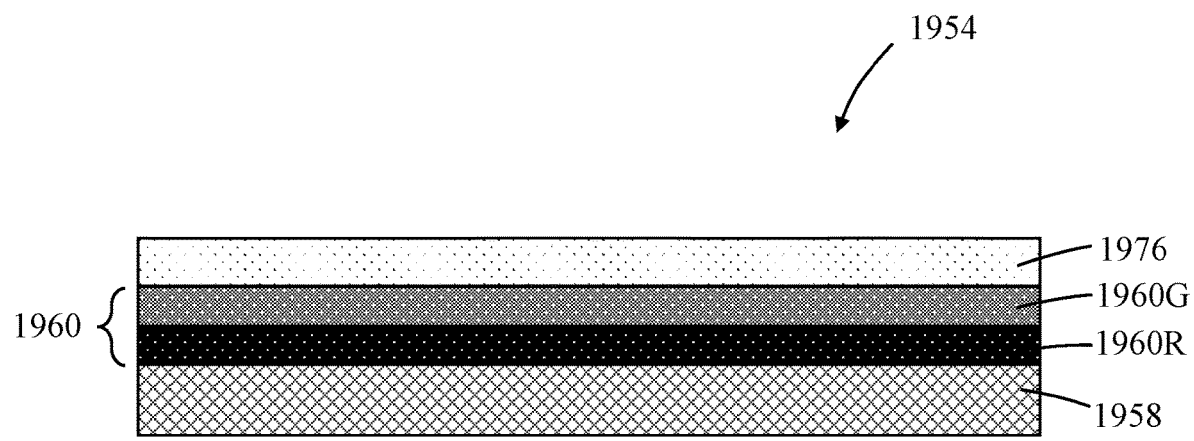

As shown in FIG. 19, the wavelength converter 1954 is the same as that shown in FIG. 14, except a light diffusive layer 1976 is deposited on top of the green photoluminescence layer 1960G on the side facing away from the filter layer 1958. The light diffusive layer 1976 ensures uniform illumination of the wavelength converter 1954 with blue excitation light (not shown).

It will be appreciated that the present invention is not restricted to the specific embodiments described and that variations can be made that are within the scope of the invention.

REFERENCE NUMERALS

00 Color LCD
02 LC Display Panel
04 Backlight
06 Front plate
08 Back plate
10 Liquid Crystal (LC)
12 Glass plate
14 Viewing face
16 First polarizing filter layer
18 Anti-reflective layer
20 Color filter plate
22 Light transmissive common electrode plane
24 Red sub-pixel filter element
26 Green sub-pixel filter element
28 Blue sub-pixel filter element
30 Unit pixel
32 Opaque divider/black matrix
34 Glass plate
36 TFT
38 Second polarizing filter layer
40 white Light
42 Backlight light emitting face
44 Excitation source
46 Enclosure Floor
48 Enclosure
50 Blue excitation light
52 Light diffusive layer
54 Wavelength converter 56 Brightness Enhancement Film (BEF)
58 Wavelength selective filter layer
60 Photoluminescence wavelength converting layer (photoluminescence layer)
62 Green photoluminescence light
64 Red photoluminescence light
66 Light guide
68 Light reflective layer
70 Light emitting face of light guide
72 Edge face of light guide
74 Light transmissive protective layer
76 Light diffusive layer
78 Light transmissive bonding layer
80 Light transmissive bonding layer

What is claimed is:

1. A display comprising:
a display panel and a backlight,
wherein the backlight comprises a blue light excitation source and
a multi-layer wavelength converter film,
wherein the multi-layer wavelength converter film comprises a wavelength selective filter film layer and a photoluminescence film layer,
wherein the photoluminescence film layer comprises a light transmissive polymeric binder material incorporating a green photoluminescence material and a red photoluminescence material; and
wherein the wavelength selective filter film layer is transmissive to blue light and is reflective to green and red light,
wherein the multi-layer wavelength converter film is positioned between the blue light excitation source and the display panel, and wherein the multi-layer wavelength converter film is a unitary construction, wherein:
the photoluminescence film layer is fabricated directly onto the wavelength selective filter film layer having no air gap between the layers; or
the photoluminescence film layer is fabricated separately to the wavelength selective film layer and directly bonded to the wavelength selective film layer with a light transmissive material with no air gaps between the layers.

2. The display of claim 1, wherein the photoluminescence film layer is multi-layered having a first film layer incorporating the green photoluminescence material and a second film layer incorporating the red photoluminescence material.

3. The display of claim 1, wherein the photoluminescence film layer is a single layer comprising a mixture of the green photoluminescence material and the red photoluminescence material incorporated in the light transmissive polymeric binder material.

4. The display of claim 1, wherein the photoluminescence film layer further comprises particles of a light scattering material incorporated in the light transmissive polymeric binder material.

5. The display of claim 1, wherein the wavelength converter film further comprises a light diffusive film layer comprising particles of a light scattering material,
wherein the light diffusive film layer is fabricated directly on the photoluminescence film layer having no air gap between the layers or
wherein the light diffusive film layer is fabricated separately and directly bonded to the photoluminescence film layer with a light transmissive material with no air gaps between the layers.

6. The display of claim 1, wherein the wavelength converter film further comprises a light transmissive protective film layer, wherein
the light transmissive protective film layer is directly fabricated on the photoluminescence layer having no air gap between the layers or
wherein the light transmissive protective film layer is fabricated separately and directly bonded to the photoluminescence film layer with a light transmissive material with no air gaps between the layers.

7. The display of claim 1, wherein the green photoluminescence material has a peak emission wavelength in a range from 530 nm to 545 nm.

8. The display of claim 1, wherein the red photoluminescence material has a peak emission wavelength in a range from 600 nm to 650 nm.

9. The display of claim 1, wherein the blue light has a dominant wavelength in a wavelength range 445 nm to 465 nm.

10. The display of claim 1, further comprising a brightness enhancement film positioned between the wavelength converter film and the display panel.

11. The display of claim 1, wherein the green photoluminescence material comprises phosphor material with a general composition $(M)(A)_2S_4$:Eu, wherein:
M is at least one of Mg, Ca, Sr and Ba; and
A is at least one of Ga, Al, In, Y.

12. The display of claim 1, wherein the red photoluminescence material comprises phosphor material with composition represented by the chemical formula $MSe_{1-x}S_x$:Eu, wherein M is at least one of Mg, Ca, Sr, Ba and Zn and $0<x<1.0$.

13. The display of claim 1, wherein the red photoluminescence material comprises phosphor material with general composition selected from the group comprising: $K_2SiF_6$:$Mn^{4+}$, $K_2GeF_6$:$Mn^{4+}$, $K_2TiF_6$:$Mn^{4+}$, $K_2SnF_6$:$Mn^{4+}$, $Na_2TiF_6$:$Mn^{4+}$, $Na_2ZrF_6$:$Mn^{4+}$, $Cs_2SiF_6$:$Mn^{4+}$, $Cs_2TiF_6$:$Mn^{4+}$, $Rb_2SiF_6$:$Mn^{4+}$, $Rb_2TiF_6$:$Mn^{4+}$, $K_3ZrF_7$:$Mn^{4+}$, $K_3NbF_7$:$Mn^{4+}$, $K_3TaF_7$:$Mn^{4+}$, $K_3GdF_6$:$Mn^{4+}$, $K_3LaF_6$:$Mn^{4+}$ and $K_3YF_6$:$Mn^{4+}$.

14. The display of claim 1, further comprising a light guide having a light emitting face and edge faces, wherein the excitation source is configured to couple blue light into at least one edge face of the light guide and wherein the wavelength converter film is disposed adjacent to the light emitting face of the waveguide.

15. The display of claim 2, wherein the second film layer is positioned between the wavelength selective filter film layer and the first film layer.

16. The display of claim 4, wherein the particles of light scattering material are selected from the group consisting of: zinc oxide (ZnO); silicon dioxide ($SiO_2$); titanium dioxide ($TiO_2$); magnesium oxide (MgO); barium sulfate ($BaSO_4$); aluminum oxide ($Al_2O_3$) and combinations thereof.

17. The display of claim 5, wherein the particles of light scattering material are selected from the group consisting of: zinc oxide (ZnO); silicon dioxide ($SiO_2$); titanium dioxide ($TiO_2$); magnesium oxide (MgO); barium sulfate ($BaSO_4$); aluminum oxide ($Al_2O_3$) and combinations thereof.

18. The display of claim 1, wherein the wavelength selected filter film layer is of a thickness 80 μm to 150 μm.

19. The display of claim 1, wherein the photoluminescence film layer is fabricated by screen printing or slot die coating.

* * * * *